United States Patent
Machiraju et al.

(10) Patent No.: US 7,647,500 B2
(45) Date of Patent: Jan. 12, 2010

(54) SYNCHRONOUS VALIDATION AND ACKNOWLEDGMENT OF ELECTRONIC DATA INTERCHANGE (EDI)

(75) Inventors: Surendra Machiraju, Redmond, WA (US); Suraj Gaurav, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 857 days.

(21) Appl. No.: 11/303,704

(22) Filed: Dec. 16, 2005

(65) Prior Publication Data

US 2007/0143610 A1 Jun. 21, 2007

(51) Int. Cl.
*H04L 9/00* (2006.01)
(52) U.S. Cl. .......................... 713/169; 705/64; 705/65; 713/170
(58) Field of Classification Search .................. None
See application file for complete search history.

(56) References Cited

U.S. PATENT DOCUMENTS

| | | | |
|---|---|---|---|
| 4,710,871 A | 12/1987 | Belknap et al. | |
| 4,729,096 A | 3/1988 | Larson | |
| 4,787,035 A | 11/1988 | Bourne | |
| 4,860,203 A | 8/1989 | Corrigan et al. | |
| 4,951,196 A | 8/1990 | Jackson | |
| 5,202,977 A | 4/1993 | Pasetes | |
| 5,557,780 A * | 9/1996 | Edwards et al. | 703/27 |
| 5,812,669 A | 9/1998 | Jenkins et al. | |
| 5,897,645 A | 4/1999 | Watters | |
| 5,983,276 A | 11/1999 | Beckett et al. | |
| 6,006,199 A | 12/1999 | Berlin et al. | |
| 6,302,326 B1 | 10/2001 | Symonds et al. | |
| 6,314,468 B1 | 11/2001 | Murphy et al. | |
| 6,353,615 B1 | 3/2002 | Bohne | |
| 6,377,953 B1 | 4/2002 | Gawlick et al. | |
| 6,591,260 B1 | 7/2003 | Schwarzhoff et al. | |
| 6,609,200 B2 | 8/2003 | Anderson et al. | |
| 6,647,527 B2 | 11/2003 | Gaultier | |
| 6,772,180 B1 | 8/2004 | Li | |
| 6,785,689 B1 | 8/2004 | Daniel et al. | |
| 7,051,072 B2 | 5/2006 | Stewart et al. | |
| 7,249,157 B2 | 7/2007 | Stewart et al. | |

(Continued)

FOREIGN PATENT DOCUMENTS

KR 1020020054248 A 7/2002

OTHER PUBLICATIONS

Jim Whitehead, Secure Electronic Data Interchange Over the Internet, May-Jun. 2005, Published by the IEEE computer Society.*

(Continued)

*Primary Examiner*—Nasser G Moazzami
*Assistant Examiner*—Fikremariam Yalew
(74) *Attorney, Agent, or Firm*—Senniger Powers LLP

(57) ABSTRACT

Synchronous validation and acknowledgment of electronic data interchange (EDI) transactions. A connection session on a communication network is established for handling EDI transactions from a source. A collection of EDI transactions is received via the communication network. A receipt acknowledgement is returned to the source indicating the EDI transactions have been received. The EDI transactions are validated as the EDI transactions are received. A validation acknowledgement is transmitted via the communication network to the source before the connection session is terminated. The validation acknowledgement indicates the EDI transactions have been validated.

20 Claims, 27 Drawing Sheets

U.S. PATENT DOCUMENTS

| | | |
|---|---|---|
| 7,281,211 B2 | 10/2007 | Jeannette et al. |
| 7,376,708 B2 * | 5/2008 | Zubeldia et al. ............. 709/208 |
| 2001/0018697 A1 | 8/2001 | Kunitake et al. |
| 2001/0042050 A1 | 11/2001 | Fletcher et al. |
| 2001/0049743 A1 | 12/2001 | Phippen et al. |
| 2001/0056504 A1 | 12/2001 | Kuznetsov |
| 2002/0042757 A1 | 4/2002 | Albazz et al. |
| 2002/0049790 A1 | 4/2002 | Ricker et al. |
| 2002/0083099 A1 | 6/2002 | Knauss et al. |
| 2002/0111964 A1 | 8/2002 | Chen et al. |
| 2002/0152175 A1 | 10/2002 | Armstrong et al. |
| 2002/0178103 A1 | 11/2002 | Dan et al. |
| 2003/0018666 A1 | 1/2003 | Chen et al. |
| 2003/0065623 A1 | 4/2003 | Corneil et al. |
| 2003/0101184 A1 | 5/2003 | Chiu et al. |
| 2003/0121001 A1 | 6/2003 | Jeannette et al. |
| 2003/0130845 A1 | 7/2003 | Poplawski |
| 2003/0140048 A1 | 7/2003 | Meier et al. |
| 2003/0158854 A1 | 8/2003 | Yoshida et al. |
| 2003/0158960 A1 | 8/2003 | Engberg |
| 2003/0167446 A1 | 9/2003 | Thomas |
| 2003/0182452 A1 | 9/2003 | Upton |
| 2003/0233420 A1 | 12/2003 | Stark et al. |
| 2004/0010753 A1 | 1/2004 | Salter et al. |
| 2004/0042492 A1 | 3/2004 | Suzuki et al. |
| 2004/0107213 A1 | 6/2004 | Zubeldia et al. |
| 2005/0004885 A1 | 1/2005 | Pandian et al. |
| 2005/0114405 A1 | 5/2005 | Lo |
| 2005/0132276 A1 | 6/2005 | Panditharadhay et al. |
| 2005/0150944 A1 | 7/2005 | Melick et al. |
| 2005/0152394 A1 | 7/2005 | Cho |
| 2005/0192880 A1 * | 9/2005 | Yamamoto et al. ............ 705/35 |
| 2005/0256892 A1 | 11/2005 | Harken |
| 2005/0256965 A1 | 11/2005 | Hohmann et al. |
| 2005/0262130 A1 | 11/2005 | Mohan |
| 2005/0278345 A1 | 12/2005 | Andra et al. |
| 2006/0036522 A1 | 2/2006 | Perham |
| 2007/0005786 A1 | 1/2007 | Kumar et al. |
| 2007/0022375 A1 | 1/2007 | Walker |
| 2007/0112579 A1 | 5/2007 | Ratnakaran et al. |
| 2007/0145138 A1 | 6/2007 | Snyder et al. |
| 2007/0220051 A1 | 9/2007 | Brentano et al. |

OTHER PUBLICATIONS

Van De Putte, Geert, et al, "Implementing EDI Solution," Oct. 2003, IBM Redbook, 244 pages.

Unknown, "Validate and Repair Transactions; Protect and Maintain a Stable HIPAA Production Environment", Instream, printed on Dec. 13, 2005, 4 pages, http://www.foresightcorp.com/e/docs/Hipaa_Validator_Instream.pdf, Foresight, USA.

Unknown, "Overview of EDI", printed on Dec. 13, 2005, 3 pages, http://publib.boulder.ibm.com/infocenter/wbihelp/index.jsp?topic=/com.ibm.wpg.config.doc/doc/hubguide/hubmst57.htm, IBM Corp., USA.

Unknown, "EDI*Net—Features and Benefits", MCI Worldcom, printed on Dec. 13, 2005, 6 pages, http://www.digitalmovers.org/MCI%20Worldcom%20Features%20!.pdf, MCI Worldcom, Inc., USA.

Meadors, Kyle, "Secure Electronic Data Interchange over the Internet", IEEE Internet Computing, vol. 9, No. 3, pp. 82-89, [May/Jun. 2005].

Adams et al., "BizTalk Unleashed", Feb. 8, 2002, Sams, 54 selected pages.

"HIPAA Transaction Sets and Code Sets (HTSCS) 270 / 271 Companion Guide Specifications", Mar. 30, 2004, South Carolina Department of Health and Human Services, Version 1.1, [internet] http://www.scdhhshipaa.org, 38 pages.

* cited by examiner

FIG. 2B

INVOICE

SOLD TO: ABC COMPANY
0887 SIXTH STREET
SAINT LOUIS, MO 63101

| ITEM NO. | ITEM NO. | COST | TOTAL |
|---|---|---|---|
| 3454 | THE LETTER A | 2200 | 3300 |
| 3455 | THE LETTER G | 4500 | 4500 |
| 4542 | THE LETTER R | 5400 | 5400 |
| 4765 | THE LETTER W | 2500 | 2500 |

214

ORDER

SOLD TO: ABC COMPANY
0887 SIXTH STREET
SAINT LOUIS, MO 63101

| ITEM NO. | ITEM NO. | COST | TOTAL |
|---|---|---|---|
| 3454 | THE LETTER A | 2200 | 3300 |
| 3455 | THE LETTER G | 4500 | 4500 |
| 4542 | THE LETTER R | 5400 | 5400 |
| 4765 | THE LETTER W | 2500 | 2500 |

```
- <ns0:X12_00401_850 xmlns:ns0="http://schemas.microsoft.com/BizTalk/EDI/X12/
2006">
 - <ns1:ST xmlns:ns1="http://schemas.microsoft.com/BizTalk/EDI/X12/2006">
    <ST01>850</ST01>
    <ST02>0001</ST02>
   </ns1:ST>
 - <ns2:BEG xmlns:ns2="http://schemas.microsoft.com/BizTalk/EDI/X12/2006">
    <BEG01>00</BEG01>
    <BEG02>NE</BEG02>
    <BEG03>3859199838</BEG03>
    <BEG05>950727</BEG05>
    <BEG08>IBM</BEG08>
   </ns2:BEG>
 - <ns3:PER xmlns:ns3="http://schemas.microsoft.com/BizTalk/EDI/X12/2006">
    <PER01>AA</PER01>
    <PER02>Andrew Carlson</PER02>
    <PER03>TE</PER03>
    <PER04>(708) 555-2930</PER04>
   </ns3:PER>
 - <ns4:DTM xmlns:ns4="http://schemas.microsoft.com/BizTalk/EDI/X12/2006">
    <DTM01>002</DTM01>
    <DTM02>970523</DTM02>
   </ns4:DTM>
 - <ns5:PO1Loop1 xmlns:ns5="http://schemas.microsoft.com/BizTalk/EDI/X12/2006">
 - <ns6:PO1 xmlns:ns6="http://schemas.microsoft.com/BizTalk/EDI/X12/2006">
    <PO101>1</PO101>
    <PO102>93</PO102>
    <PO103>BX</PO103>
    <PO104>145.39</PO104>
    <PO106>CB</PO106>
    <PO107>KOW-20392-10</PO107>
   </ns6:PO1>
 - <ns7:PIDLoop1 xmlns:ns7="http://schemas.microsoft.com/BizTalk/EDI/X12/2006">
 - <ns8:PID_2 xmlns:ns8="http://schemas.microsoft.com/BizTalk/EDI/X12/2006">
    <PID01>F</PID01>
    <PID05>Uninterruptible Power System</PID05>
   </ns8:PID_2>
   </ns7:PIDLoop1>
 - <ns9:PER_3 xmlns:ns9="http://schemas.microsoft.com/BizTalk/EDI/X12/2006">
    <PER01>AA</PER01>
    <PER02>Camilla Anderson</PER02>
    <PER03>TE</PER03>
    <PER04>(708) 555-2011</PER04>
   </ns9:PER_3>
   </ns5:PO1Loop1>
 - <ns10:PO1Loop1 xmlns:ns10="http://schemas.microsoft.com/BizTalk/EDI/X12/
2006">
 - <ns11:PO1 xmlns:ns11="http://schemas.microsoft.com/BizTalk/EDI/X12/2006">
    <PO101>2</PO101>
    <PO102>25</PO102>
    <PO103>EA</PO103>
    <PO104>35.68</PO104>
        ⋮
    <SE01>14</SE01>
    <SE02>0001</SE02>
   </ns21:SE>
   </ns0:X12_00401_850>
```

```
ISA+01+aaaaaaaaaa+03+aaaaaaaaaa+ZZ+7654321      +ZZ+
7654321+051121+1814+*+00401+000000021+1+T+:'
GS+AE+sender+receiver+051121+1814+9+X+00401'
ST+850+0010'
BEG+00+NE+3859199838++950727+++IBM'
PER+AA+Andrew Carlson+TE+(708) 555-2930'
DTM+002+970523'
PO1+1+93+BX+145.39++CB+KOW-20392-10'
PID+F++++Uninterruptible Power System'
PER+AA+Camilla Anderson+TE+(708) 555-2011'
PO1+2+25+EA+35.68++CB+1093-4927-001'
PID+F++++High Volume Printer Stand'
PER+AA+Miranda Cappelan+TE+(708) 555-1111'
PO1+3+4+PC+2002.91++CB+ABX-2001'
PID+F++++Electronics Cabinet Package (56" High)'
CTT+3'
SE+14+0010'
GE+1+9'
IEA+1+000000021'
```

PARTNER PROPERTIES

PARTNER AGREEMENT
SENDER ROLE
  X12 PROPERTIES
  EDIFACT PROPERTIES
  ACK, VALIDATION AND BATCHING
RECEIVER ROLE
  X12 PROPERTIES
    ISA SEGMENT
    GS/ST SEGMENT
  EDIFACT PROPERTIES
    UNA SEGMENT
    UNB SEGMENT
    UNG/UNH SEGMENTS
  ACK AND VALADATION SETTINGS
  BATCH SETTINGS

X12 PROPERTIES

INTERCHANGE CONTROL HEADER

AUTHORIZATION:    QUALIFIER [ISA1]: ▼    INFORMATION [ISA2]:

SECURITY:    QUALIFIER [ISA3]: ▼    INFORMATION [ISA4]:

SENDER IDENTIFIER    ID QUALIFIER [ISA5]: ZZ ▼    IDENTIFIER [ISA6]:

☐ USE ISA11 AS REPETITION SEPARATOR
☐ CHECK FOR DUPLICATE CONTROL NUMBER, ISA13 [IN DAYS]

GROUP CONTROL HEADER
☐ CHECK FOR DUPLICATE GROUP NUMBER [GS6] IN INTERCHANGE

| | DEFAULT | SENDER ID | TRANSACTION ID | TARGET NAMESP... | VER |
|---|---|---|---|---|---|
| △ | ✓ 714 | ▼ | 410 | http://schemas... | 004 |
|   | ☐ | ▼ | 650 | http://schemas... | 004 |
| * | ☐ | ▼ | | | |

TRANSACTION SET HEADER
☐ CHECK FOR DUPLICATE TRANSACTION NUMBER [ST03]:
IMPLEMENTATION CONVENTION [ST03]:

FIG. 7C

PARTNER PROPERTIES

- PARTNER AGREEMENT
- SENDER ROLE
  - X12 PROPERTIES
  - EDIFACT PROPERTIES
  - ACK, VALIDATION AND BATCHING
- RECEIVER ROLE
  - X12 PROPERTIES
    - ISA SEGMENT
    - GS/ST SEGMENT
  - EDIFACT PROPERTIES
    - UNA SEGMENT
    - UNB SEGMENT
    - UNG/UNH SEGMENTS
    - ACK AND VALADATION SETTINGS
    - BATCH SETTINGS

EDIFACT PROPERTIES

INTERCHANGE HEADER

☐ CHECK FOR DUPLICATE CONTROL REFERENCE [UNB5]

VALIDITY IN DAYS ☐

RECIPIENT REFERENCE PASSWORD [UNB6]:

VALUE: ☐   QUALIFIER: ☐

FUNCTIONAL GROUP [UNG]

☐ CHECK FOR DUPLICATE GROUP CONTROL NUMBER [GS6] IN INTERCHANGE

| DEFAULT | UNG 2.1 | UNG 2.2 | UNG8 | TRANSACTION | TARGET NAMESP... |
|---|---|---|---|---|---|
| ✓ | Hws | CC | d98b | ⌵ | http://schemas... |
| * | Sft | CC | d94a | ⌵ | http://schemas... |
| | | | | ⌵ | |
| | 716 | 718 | 720 | 722 | |

TRANSACTION SET HEADER [UNH]

☐ CHECK FOR DUPLICATE TRANSACTION SET CONTROL NUMBER IN GROUP

FIG. 7D

PARTNER PROPERTIES

COMMON
SENDER ROLE
  X12 PROPERTIES
  RECEIVER ROLE
  X12 PROPERTIES
    ISA SEGMENT
    GS/ST SEGMENT
  EDIFACT PROPERTIES
    UNA SEGMENT
    UNB SEGMENT
    UNG/UNH SEGMENTS

X12 PROPERTIES
INTERCHANGE HEADER [ISA]
                QUALIFIER:      INFORMATION:
AUTHORIZATION:  [▼]             [FALLCOLOR]
SECURITY:       [▼]             [COLOR]
☐ CHECK FOR DUPLICATE CONTROL NUMBER,
VALIDITY [IN DAYS] [30]
GROUP CONTROL HEADER
☐ CHECK FOR DUPLICATE GROUP NUMBER IN INTERCHANGE
VERSION/RELEASE:  [▼]  — 724
TARGET NAMESPACE: [          ]
MESSAGE HEADER
☐ CHECK FOR DUPLICATE TRANSACTION SET CONTROL NUMBER IN GROUP
GENERATE ACK
☑ GENERATE TA1
☑ GENERATE 997
☐ EDIT TRANSACTION SET CONTROL NUMBER  [          ]

[HELP]                    [OK]  [CANCEL]  [APPLY]

FIG. 8B

```
           ISA+01+aaaaaaaaaa+03+aaaaaaaaaa+ZZ+7654321        +ZZ+
           7654321+051121+1814+*+00401+000000021+1+T+:'
    532 ─▶ GS+AE+sender+receiver+051121+1814+[9]+X+00401'
           ST+850+0010'              ╲─ 828
           BEG+00+NE+3859199838++950727+++IBM'
           PER+AA+Andrew Carlson+TE+(708) 555-2930'
           DTM+002+970523'
           PO1+1+93+BX+145.39++CB+KOW-20392-10'
           PID+F++++Uninterruptible Power System'
           PER+AA+Camilla Anderson+TE+(708) 555-2011'
           PO1+2+25+EA+35.68++CB+1093-4927-001'
           PID+F++++High Volume Printer Stand'
           PER+AA+Miranda Cappelan+TE+(708) 555-1111'
           PO1+3+4+PC+2002.91++CB+ABX-2001'
           PID+F++++Electronics Cabinet Package (56" High)'
           SE+14+0010'
       ─▶  GE+2+[10]'╲─ 830
    534    IEA+1+000000021'
```

FIG. 9A

| POS.# | SEG. ID | NAME | REQ.DES. | MAX USE | LOOP REPEAT |
|---|---|---|---|---|---|
| 010 | ST | TRANSACTION SET HEADER | M | 1 | |
| 020 | AK1 | FUNCTIONAL GROUP RESPONSE HEADER | M | 1 | |
| | | LOOP ID – AK2 | | | 999999 |
| 030 | AK2 | TRANSACTION SET RESPONSE HEADER | O | 1 | |
| | | LOOP ID – AK2/AK3 | | | 999999 |
| 040 | AK3 | DATA SEGMENT NOTE | O | 1 | |
| 050 | AK4 | DATA ELEMENT NOTE | O | 99 | |
| 060 | AK5 | TRANSACTION SET RESPONSE TRAILER | M | 1 | |
| 070 | AK9 | FUNCTIONAL GROUP RESPONSE TRAILER | M | 1 | |
| 080 | SE | TRANSACTION SET TRAILER | M | 1 | |

FIG. 9B

| POS.# | TAG | NAME | S | R |
|---|---|---|---|---|
| 0010 | UNH | MESSAGE HEADER | M | 1 |
| 0020 | UCI | INTERCHANGE RESPONSE | M | 1 |
| 0030 | | ─── SEGMENT GROUP 1 ─── | C | 999999 |
| 0040 | UCM | MESSAGE /PACKAGE RESPONSE | M | 1 |
| 0050 | | ─── SEGMENT GROUP 2 ─── | C | 999 |
| 0060 | UCS | SEGMENT ERROR INDICATION | M | 1 |
| 0070 | UCD | DATA ELEMENT ERROR INDICATION | C | 99 |
| 0080 | | ─── SEGMENT GROUP 3 ─── | C | 999999 |
| 0090 | UCF | GROUP RESPONSE | M | 1 |
| 0100 | | ─── SEGMENT GROUP 4 ─── | C | 999999 |
| 0110 | UCM | MESSAGE/PACKAGE RESPONSE | M | 1 |
| 0120 | | ─── SEGMENT GROUP 5 ─── | C | 999 |
| 0130 | UCS | SEGMENT ERROR INDICATION | M | 1 |
| 0140 | UCD | DATA ELEMENT ERROR INDICATION | C | 99 |
| 0150 | UNT | MESSAGE TRAILER | M | 1 |

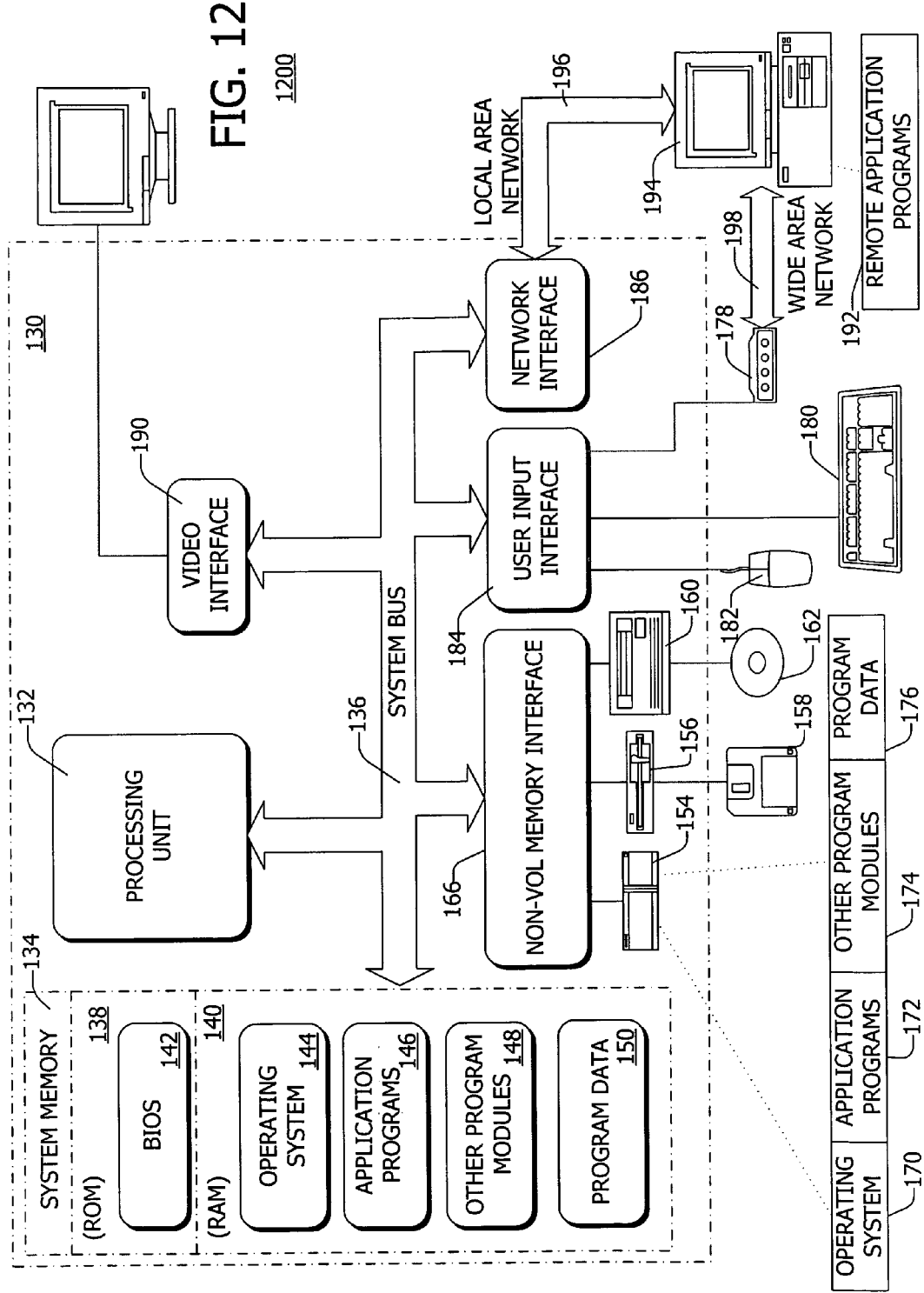

SYNCHRONOUS VALIDATION AND ACKNOWLEDGMENT OF ELECTRONIC DATA INTERCHANGE (EDI)

BACKGROUND

In facilitating the handling of transactions, business entities frequently transmit business transaction data electronically in a strict format over common communications networks. For example, the electronic data interchange (EDI) is one of the ways that businesses take advantages of the ever-expanding reach of automated computing systems.

In EDI, business data is formatted according to one or more known and approved standards, such as ANSI X12 or EDI-FACT. For example, the EDI data representing various transactions are transmitted as a batch of delineated documents, and each of the delineated documents is encoded according to strict formatting rules to ensure the destination application receiving the documents is able to successfully parse and consume the information for down stream processing.

In parsing and processing the EDI messages, existing systems transmit EDI data and include the formatting rules or schemas in each delineated document during the interchange. For example, the EDI data representing a purchase order transaction includes a schema for the purchase order transaction. As such, each EDI transaction document includes both the EDI data and the specific schema for the transaction. While this arrangement or configuration facilities parsing of the EDI data, it is static and makes each transaction document large in terms of document size. In addition, the included schema is not sharable. In other words, if there are two purchase order transaction documents A and B, each purchase order transaction document needs to include a purchase order schema even though the schema in each document is identical. Also, EDI transactions are charged, among other things, according to the number of lines or documents, and bandwidth needed for transmitting the EDI data. As business entities transmit millions of transactions on a daily basis using EDI, these large EDI transaction documents, which include duplicate schema information, create unnecessary costs for having redundant schema information.

Once the EDI transaction documents are received, the destination application typically stores the EDI transaction documents in a memory area. The destination application next transmits a receipt acknowledgement to the source indicating that the transactions have been received. The stored EDI transactions are thereafter validated by applications to determine whether the EDI data included in the transaction documents comply with the formatting rules of the schemas for the transaction types. During this validation time, the source (e.g., a merchant or a customer) is required to wait for a validation acknowledgement to indicate that the transaction data conforms to the format. If it is determined that one or more transactions are not formatted correctly, replacement EDI transaction documents need to be re-transmitted for processing. This waiting-for-validation delay further reduces the efficiency of processing EDI transactions.

SUMMARY

Embodiments of the invention overcome the shortfalls of existing systems in handling EDI transactions by transforming EDI transaction files into one EDI document with nested structures or sub-documents identifying various EDI transaction types. In addition, aspects of the invention enable the EDI document to reference schemas by making instances of schemas available when the EDI transactions are processed at runtime. Advantageously, embodiments of the invention automatically recognize the schemas associated with the transaction types and process the EDI transactions as the EDI transactions are received. According to other embodiments of the invention, the EDI transactions are validated as the EDI transactions are received.

In yet another embodiment of the invention, a unitary meta-schema is defined to represent a plurality of schemas. The unitary meta-schema is provided to end users to modify properties of the schemas.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIGS. 2A to 2C are diagrams illustrating structures of transaction data using electronic data interchange (EDI) according to an embodiment of the invention.

FIGS. 5B and 5C are block diagrams illustrating serializing EDI transactions according to an embodiment of the invention.

FIGS. 7A to 7D are screen shots illustrating automatic identifying EDI schemas according to an embodiment of the invention.

FIG. 8B is a diagram illustrating detecting errors in EDI transactions according to an embodiment of the invention.

FIGS. 9A and 9B are diagrams illustrating EDI validation acknowledgement structures according to an embodiment of the invention.

FIG. 12 is a block diagram illustrating one example of a suitable computing system environment in which the invention may be implemented.

Figure 10A:
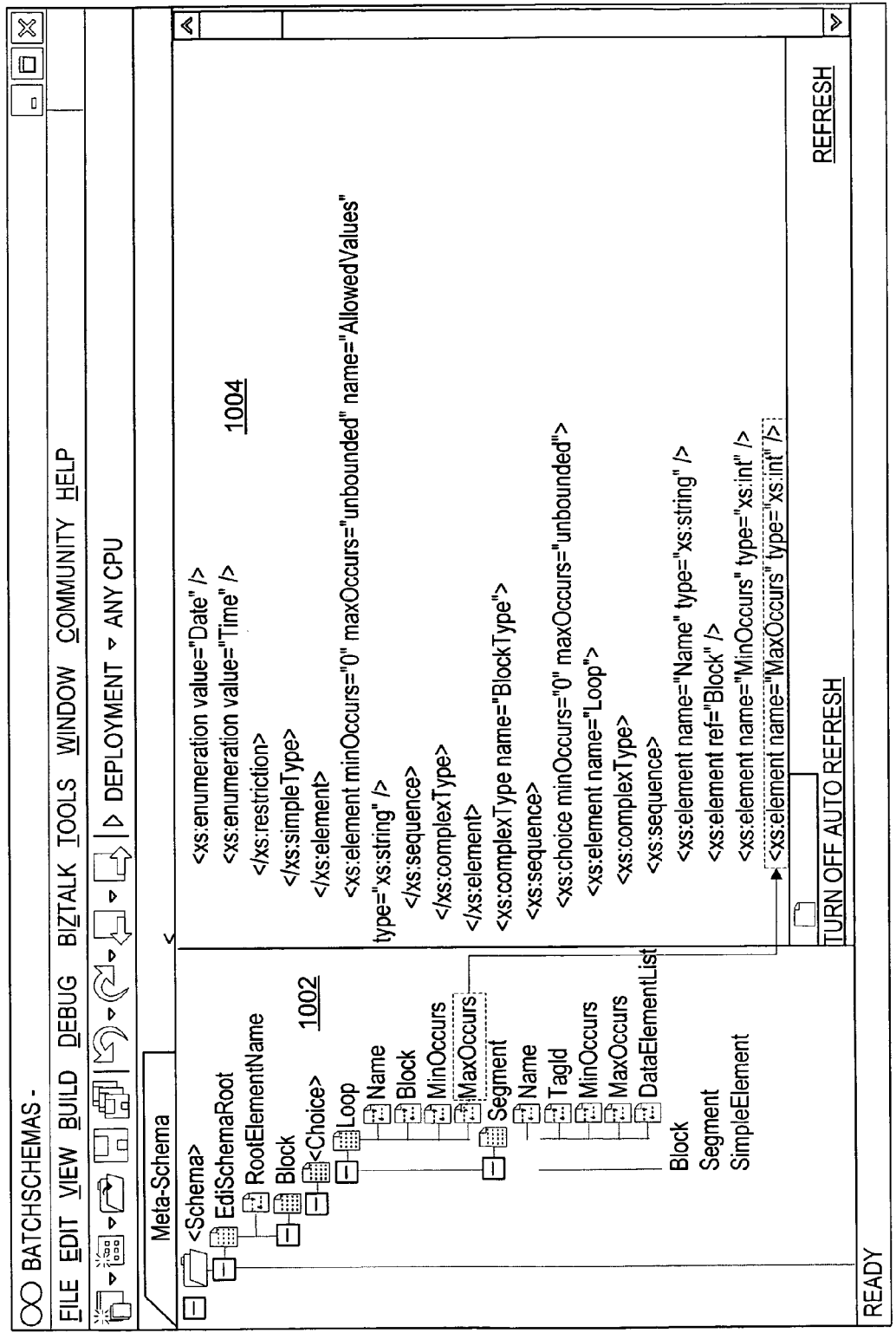
FIG. 10A is a screen shot illustrating a unitary meta-schema for modifying a plurality of EDI schemas according to an embodiment of the invention.

Appendix A describes the XML schema shown in FIG. 10A in its entirety.

Appendix B shows an exemplary unitary meta-schema in XML format representing a purchase order schema.

Corresponding reference characters indicate corresponding parts throughout the drawings.

DETAILED DESCRIPTION

Figure 1:
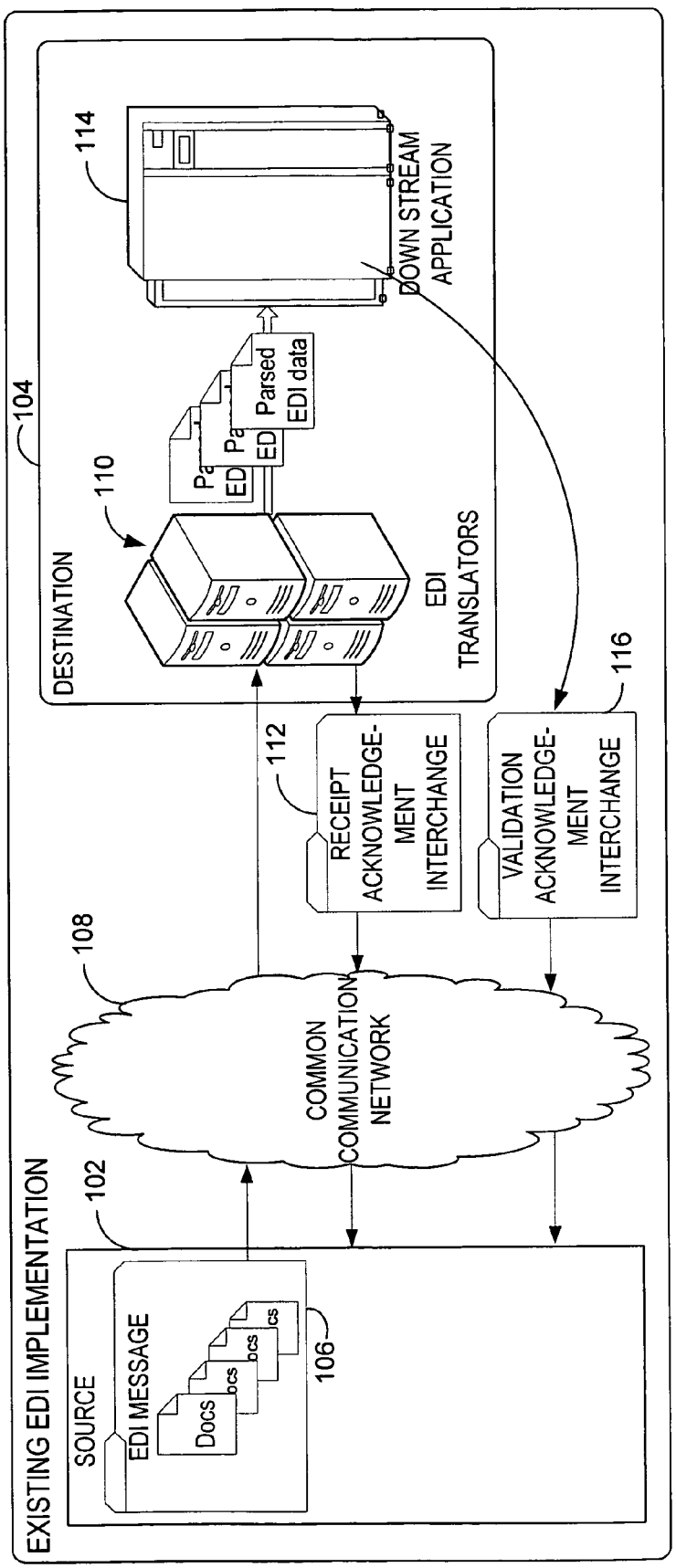
FIG. 1 is a block diagram illustrating an implementation of handling EDI transactions.

FIG. 1 is a block diagram illustrating an implementation of handling EDI transactions. Initially, as illustrated in FIG. 1, a source (e.g., a business partner) 102 transmits an EDI message 106, which may include an invoice 202, to a destination (e.g., a business customer) 104 through a common communications network 108.

The source 102 transmits the EDI message 106, including the schemas and the EDI transaction data, to the destination 104 via the common communications network 108. In one example, the EDI message 106 includes a plurality of EDI transaction data in a batch so as to save transmission or bandwidth cost. In another example, the common communications network 108 may be a private, dedicated network, such as an intranet, or a public network, such as an internet. In another example, the common communications network 108 includes one or more network protocols, such as FTP, HTTP, Kermit, Xmodem, frame delay, EDIINT, 3780 Bisync®, or the like, to facilitate the transmission of EDI messages between the partners.

The source 102 initiates the transmission of EDI message 106 by opening a connection session (e.g., a secured socket connection session) with the destination 104 via the common communications network 108. Once the connection session is opened, the source 102 transmits the EDI message 106 to the destination 104. A set of EDI translator systems 110 on the destination 104 receives the EDI message 106, and the EDI translator systems 110 transmit a receipt acknowledgement 112 to the source 102 via the common communications network 108 indicating that the EDI message has been received. It is common that the receipt acknowledge is transmitted or returned to the source 102 before the source 102 closes the connection session.

Once the EDI message 106 is received, the EDI data associated with EDI transactions are parsed and processed by the EDI translator systems 110. As known by those skilled in the art, the parsing and/or decoding of EDI transaction involves one or more steps of identifying the various EDI standards, the schema specifications, or the like. In doing so, the EDI translator systems 110 transmit the parsed or decoded EDI data to a downstream application 114 to process the parsed or decoded EDI data. For example, the downstream application 114 may be an accounting application to process invoices or software for handling purchase order data. As such, the downstream application 114 is able to validate whether the received EDI data, after parsing and decoding, conforms to the formatting rules specified in the schemas. If the received EDI data conforms to the schema rules, the downstream application 114 transmits a validation acknowledgement 116 to the source 102. If, on the other hand, the received EDI data includes errors or is invalid, the downstream application 114 may transmit an error notification to the source indicating the error of the received EDI data.

The validation acknowledgement 116 is usually transmitted to the source 102 with a delay after the transmission of receipt acknowledgement. In other implementations, the parsed EDI data is stored in a database or a data store (not shown) waiting to be validated. As such, the source 102 is frequently asked to wait for the validation acknowledgement 116 to ascertain that the EDI data can be properly processed by the destination 104.

Figure 2A:
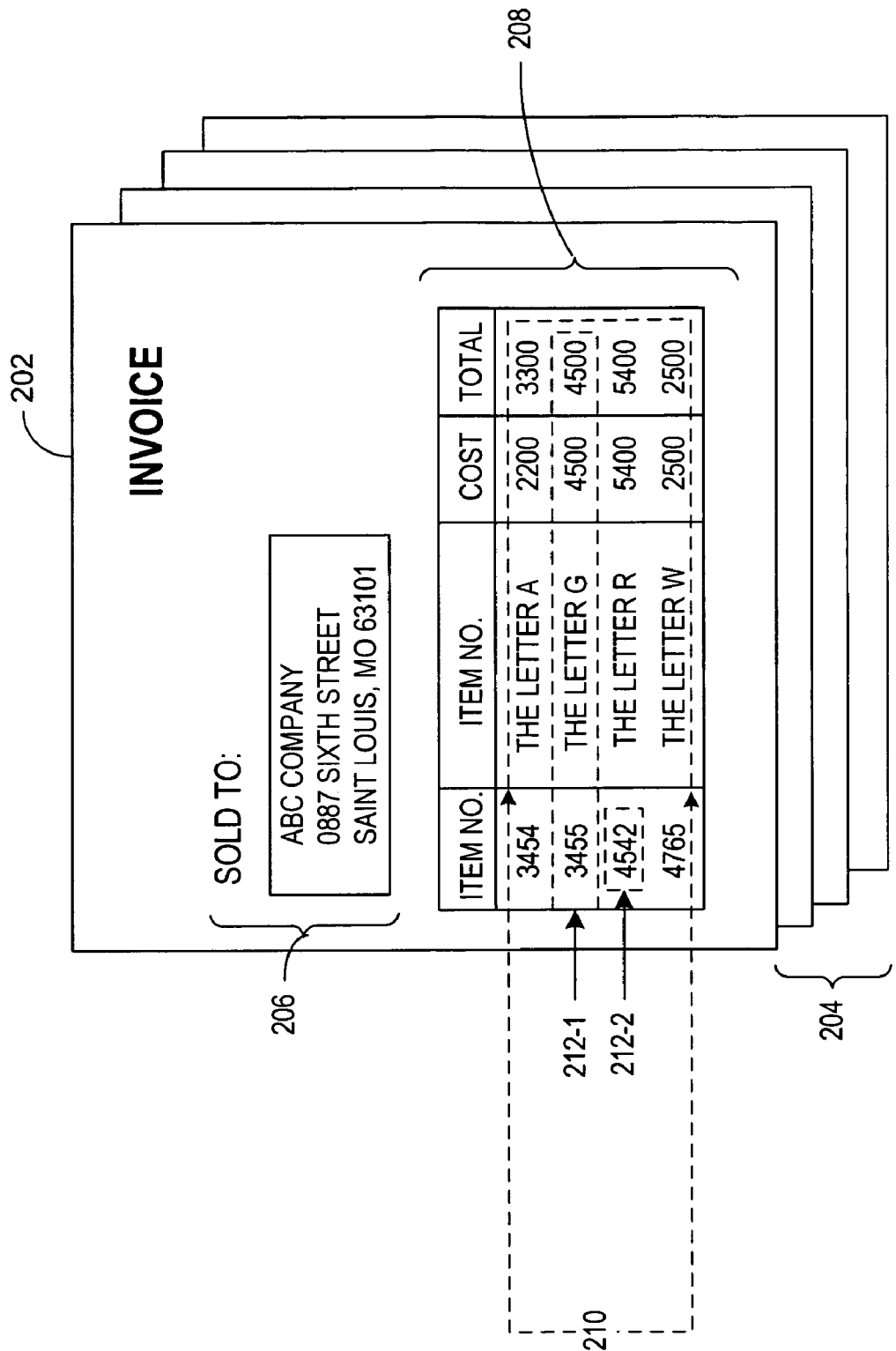
Figure 2C:
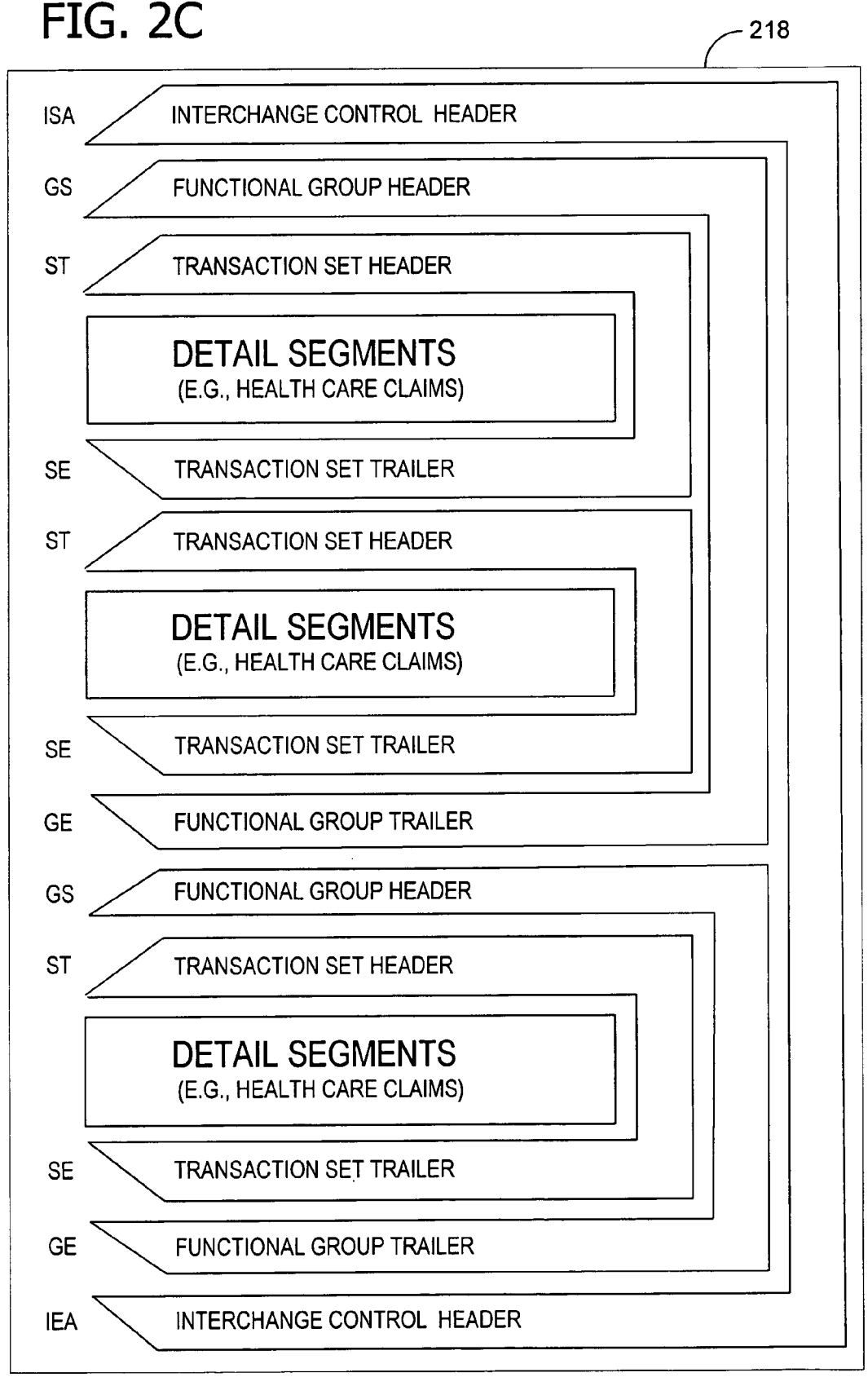

FIGS. 2A to 2C are diagrams illustrating structures of transaction data using electronic data interchange (EDI) according to an embodiment of the invention. FIG. 2A illustrates an example of a representation of an invoice EDI transaction document 202 using the ANSI X12 format. In this example, the invoice 202 includes a number of segments or sections (see FIG. 2C for an overview of an X12 EDI interchange structure 218) such as a functional group 204 section, which may include additional information of the invoice 202. For example, in a supply chain sector, it is known to those skilled in the art that the information or values in the functional group 204 are identical to information or values in an interchange section (e.g., interchange control header), as shown in FIG. 2C. In another example, the information or values in the functional group 204 includes values or identifiers to identify a business or operating unit within a larger enterprise.

The invoice 202 also includes a header portion 206 which includes information such as the business customer's information. In this example, the header portion 206 includes the business customer's name "ABC Company" and address "0887 Sixth Street, Saint Louis, Mo. 63101." In one embodiment, the header portion 206 includes destination information for receiving validation acknowledgements, see discussions on FIGS. 8, 9A and 9B below. The invoice 202 also includes a detail table section 208 showing one or more data segments 212 which is organized in a loop 210. For example, the loop 210 includes a group of semantically related data segments, and, to those who are skilled in the art, these segments may be either bounded or unbounded according to ANSI X12.6.

Additional segment types and sections and corresponding information may be included in an EDI transaction document according to the ANSI X12 or EDIFACT format without departing from the scope of the invention. For example, FIG. 2B illustrates one or more transactions types included in the same EDI message 106 to be processed at the destination 104. An invoice 214 and a purchase order 216 EDI transaction documents are being included in the EDI message 106 because the invoice 214 and the purchase order 216 are related to the same customer, "ABC Company." Additional groups of related transactions documents may be included in the interchange as the EDI message 106. In an embodiment, the EDI documents for one destination or customer may be sent in a batch.

It is also to be understood that each of the EDI transaction types is required to conform to the schema that is associated with the transaction type. For example, an invoice transaction schema may require, among other things, a certain limitation on the maximum or minimum length of characters for the name of the merchant or the buyer. A purchase order transaction schema may require a maximum number of digits after the decimal point. In another example, the schema for various transaction types may specify that a particular field is mandatory while others are optional.

Existing implementations include the transaction schemas in the EDI transaction documents when transmitting the EDI transactions to the customer, such as a destination 104. While these implementations facilitate the decoding the EDI transactions, they require the schema designers to spend a substantial amount of time designing or configuring the schemas before transmitting the EDI transactions to business partners. Also, subsequent modifications to the schemas due to modification of business agreements between partners are required to redesign the schemas.

As such, embodiments of the invention overcome the deficiencies of existing implementations by transforming the EDI message to one consolidated EDI document with nested structures or sub-documents organizing one or more EDI transactions according to the transaction types. The EDI document also includes an uber-schema for representing a plurality of schemas associated with the transaction types. In another embodiment, a runtime schema map is transforming the plurality of schemas for processing at runtime at the destination 104.

Figure 3:
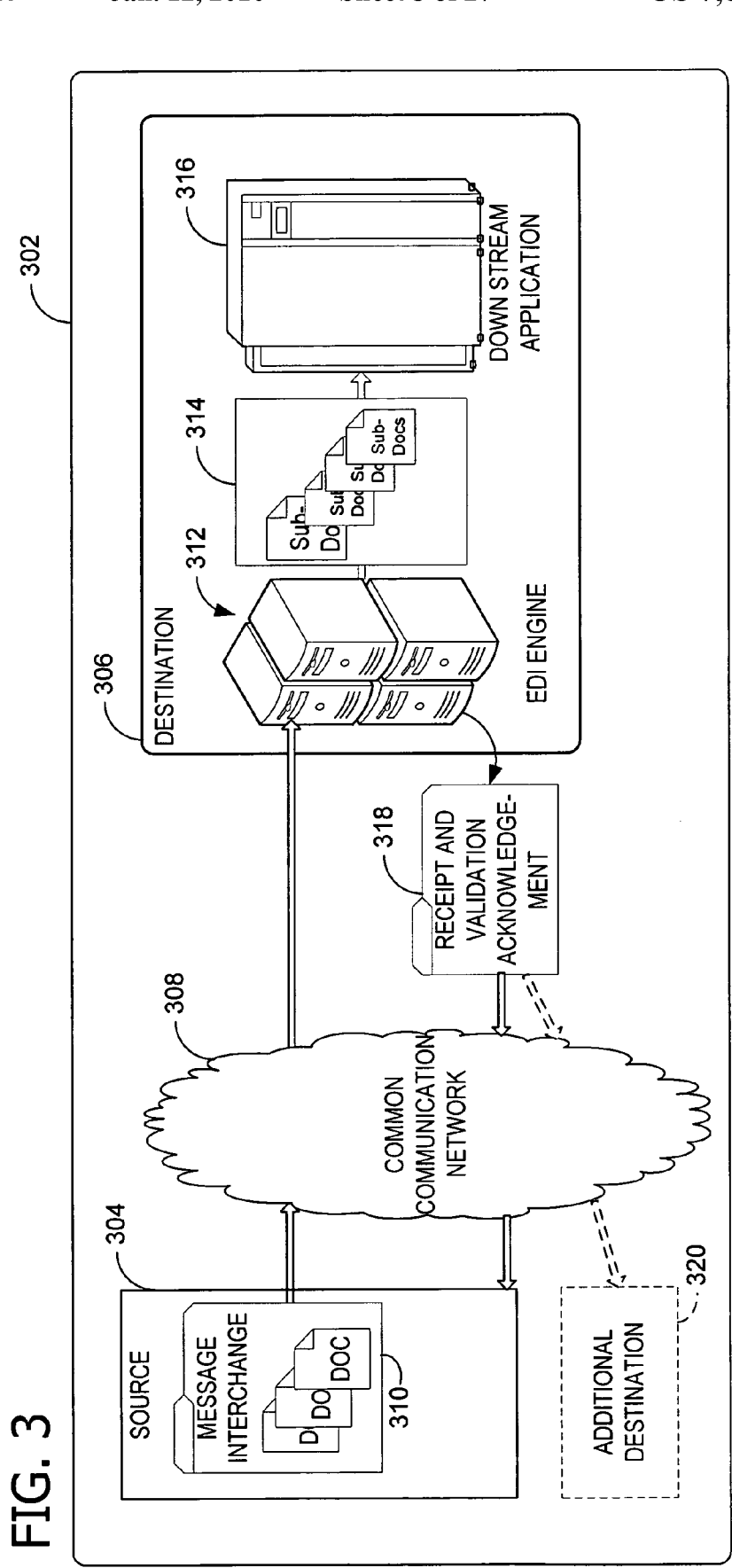
FIG. 3 is an exemplary block diagram illustrating a system for transforming EDI transactions according to an embodiment of the invention.

Referring now to FIG. 3, a block diagram illustrates a system 302 for transforming EDI transactions according to an embodiment of the invention. The system 302 includes a source 304 which may be a merchant transacting business with a destination 306 or a customer. For example, the source 304 may be a merchant such as a consumer electronics retail store selling large quantities of goods to a corporate customer purchasing computing equipment. In another example, the source 304 may be a healthcare provider, such as a hospital or a pharmacy, and transmits EDI data to a health care insurance company or a clearing house for submitting claims or for compliance with provisions of the Health Insurance Portability and Accountability Act (HIPAA).

In one embodiment, the source 304 and the destination 306 include one or more computing devices such as a computer 130 in FIG. 12 for sending EDI documents in a batch. Initially, the source 304 transmits an EDI message 310 including a plurality of EDI documents. Each of the EDI documents includes at least one EDI transaction corresponding to a transaction type (e.g., invoice, purchase order, account payable, or the like).

Figure 4A:
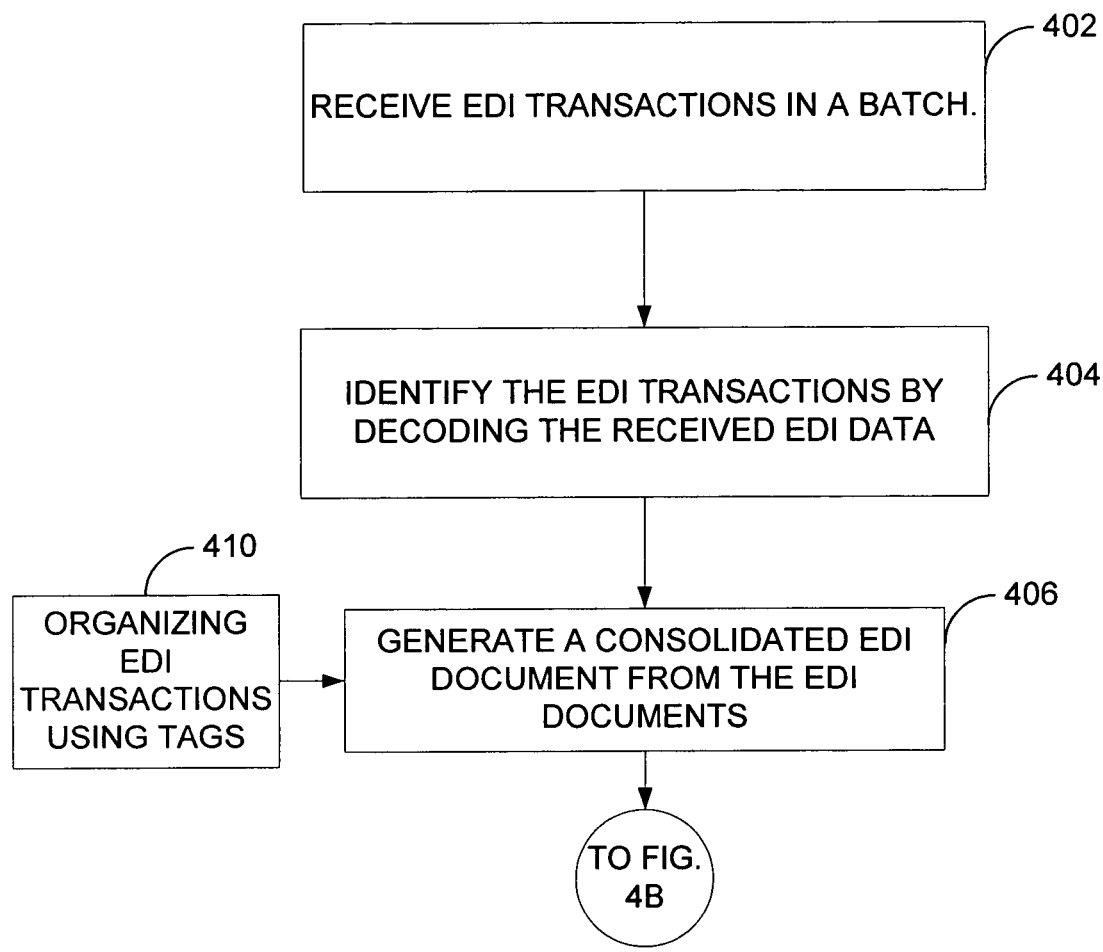
FIGS. 4A and 4B are flow diagrams illustrating transforming of EDI transactions according to an embodiment of the invention.

Referring also to FIG. 4A, a flow diagram illustrates transforming EDI transactions according to an embodiment of the invention. After the source 304 opens a connection session on the communications network 308 to communicate with the destination 306, the source 304 transmits the EDI message 310 to the EDI engine 312 of the destination 306. In one embodiment, the EDI engine 312 includes one or more computing devices (e.g., computer 130) executing computer-executable instructions, routines, or functions. At 402, the EDI engine 312 receives the EDI message 310 including the plurality of EDI documents. At 404, the EDI engine 312 identifies the EDI transactions included in the plurality of EDI documents. Using ANSI X12 example above, the EDI engine 312 decodes or parses an X12 invoice by identifying the various data headers and data segments (e.g., ISA, GS, or the like) illustrated in FIG. 2C to determine the EDI data in the transactions. In another embodiment, the EDI engine 312 also identifies the various schemas included in the plurality of EDI documents to determine the specific formatting rules for the transaction types.

Figure 6A:
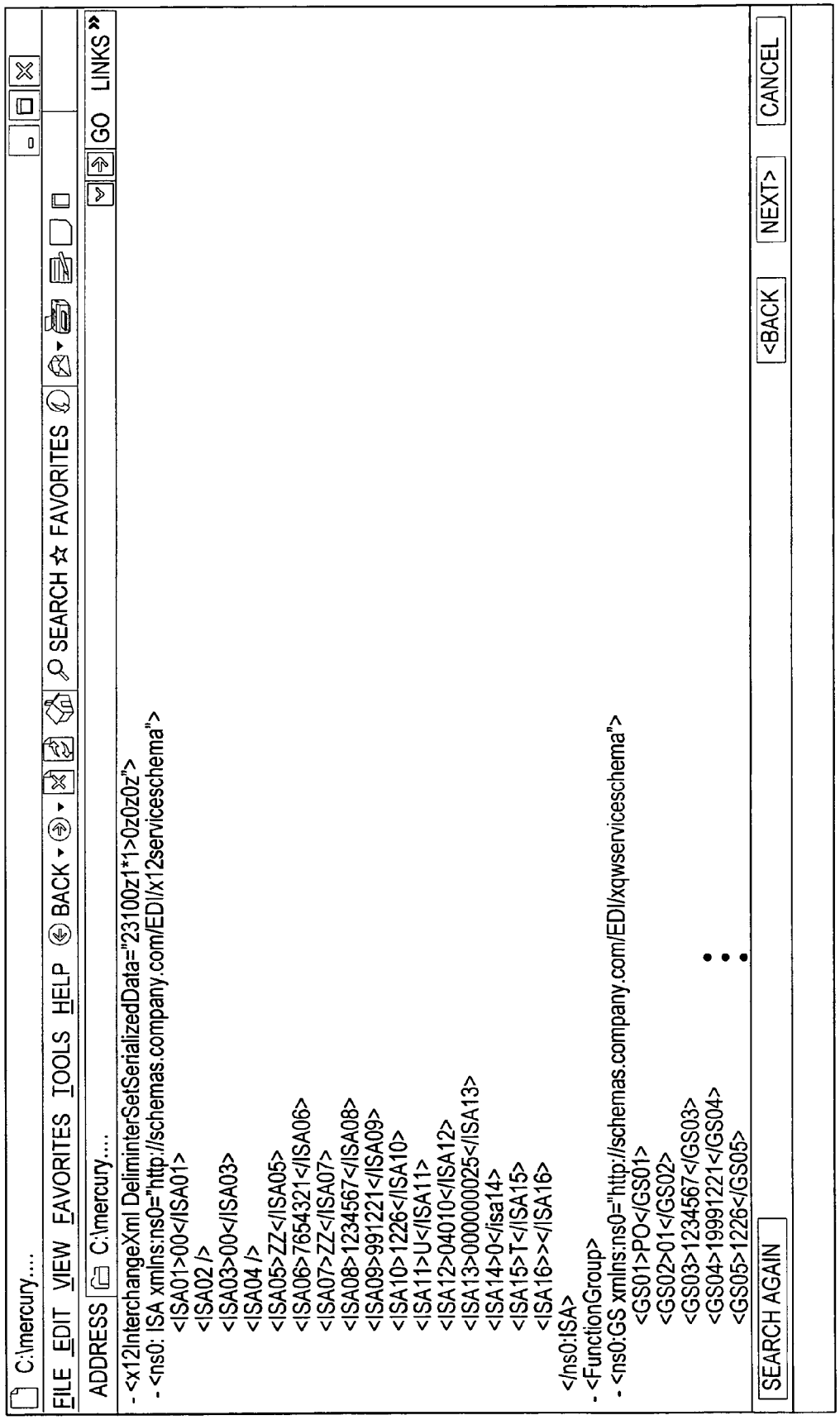
FIGS. 6A and 6B are screen shots illustrating transformed EDI transactions included in a consolidated EDI document in eXtensible Markup Language (XML) document format according to an embodiment of the invention.

At 406, the EDI engine 312 generates a consolidated EDI document 314 from the plurality of EDI documents in the batch. In one example, the EDI engine 312 generates the consolidated EDI document 314 as an XML document with XML structure markup tags at 410. For example, unlike the existing implementations where each transaction is organized as one document, embodiments of the invention organize the EDI transactions in the plurality of EDI documents as one XML document which not only defines individual transaction sets but also to define interchanges by capturing all aspects of the EDI data, including segments, loops, fields, delimiters, etc. In one example, FIG. 6A illustrates an exemplary consolidated XML document including one or more EDI transactions, such as "PO (purchase order)".

Figure 6B:
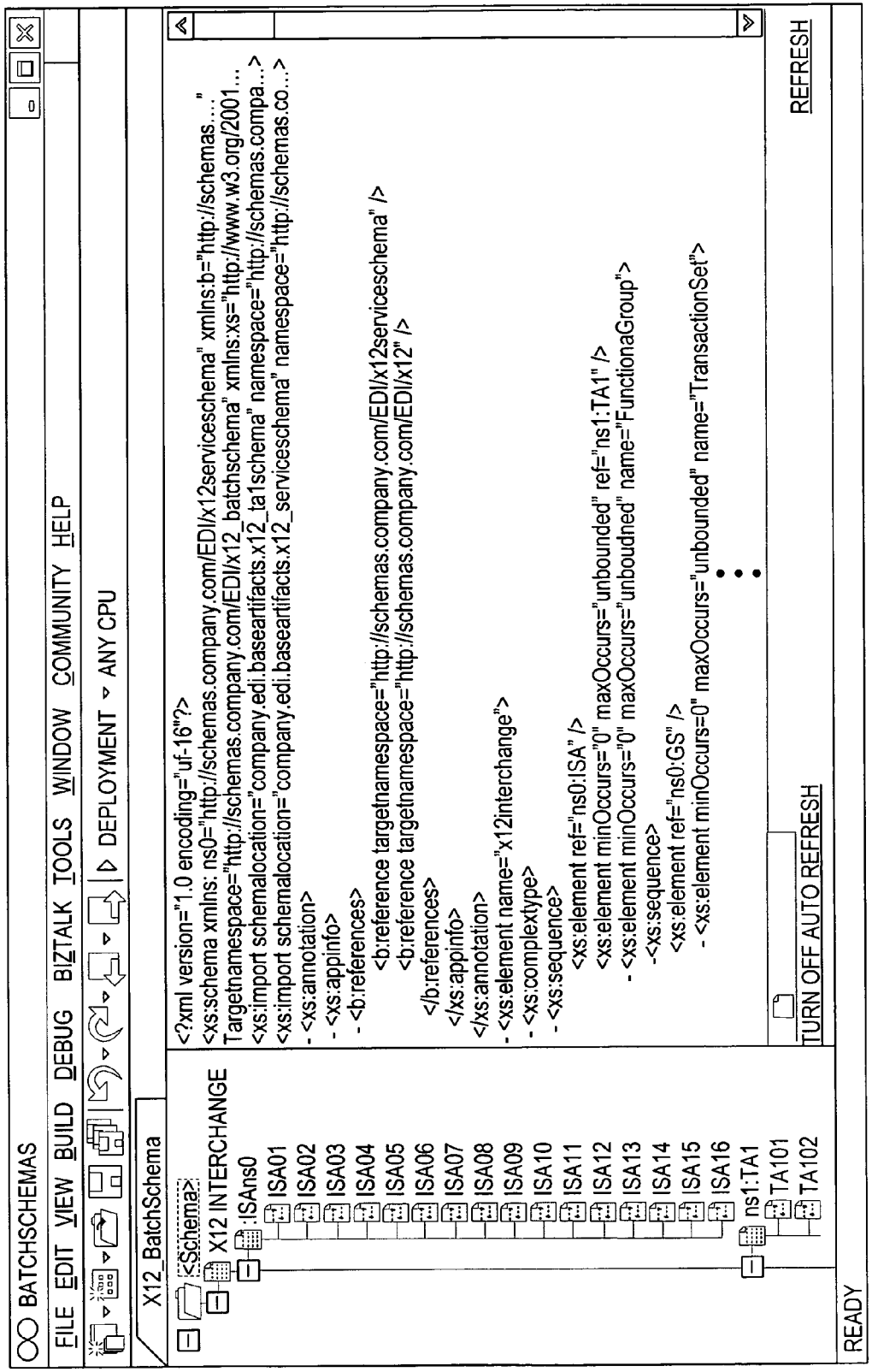

In yet another embodiment, the consolidated EDI document 314 includes an uber-schema representing a plurality of schemas referenced by the EDI transactions. For example, the uber-schema is included in EDI transaction sets and is embedded or stitched inside functional groups and envelope segments of each EDI transactions such that an end user is not required to create a specific schema for each transaction set that are expected to be included in the EDI message 310. As an example, FIG. 6B shows a screen shot illustrates an uber-schema in XML format in the consolidated EDI document 314 according to an embodiment of the invention. With such design, the interchange of the consolidated EDI document 314 reduces the need to include one or more schemas each corresponding to a transaction type in the EDI documents. Embodiments of the invention also reduce the schema design and development time before the transmission.

Figure 4B:
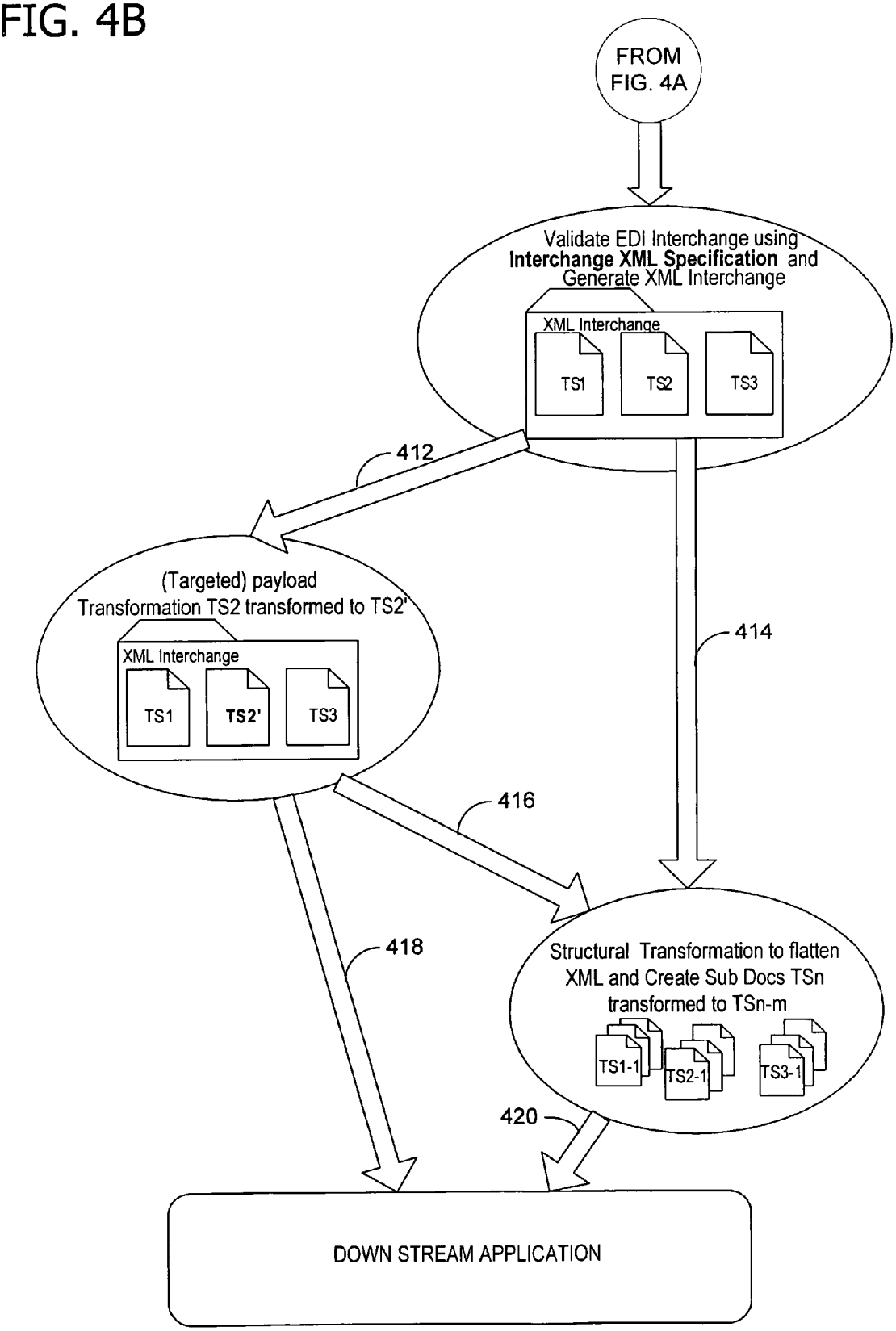

In another embodiment, at 412 in FIG. 4B, the EDI engine 312 transforms the consolidated EDI document with the runtime schema map or a payload schema. At 414, the EDI engine 312 creates sub-documents or nested structures for the EDI transaction in the consolidated EDI document 314 (see Tables 1 and 2 for additional descriptions). In an alternative embodiment, the consolidated EDI document 314 is transformed by the payload schema (e.g., runtime schema map) and may also be structurally transformed at 416. Alternatively, the consolidated EDI document 314 may be transmitted to the downstream application 316 for processing without structural transformation at 418. At 420, the consolidated EDI document 314 with sub-documents or nested structure is also transmitted to the downstream application 316 for processing.

It is to be understood that formats other than XML for the consolidated EDI document 314 with markup tags defining and organizing the EDI transactions in identifiable structures may be used without departing from the scope of the invention.

Figure 11A:
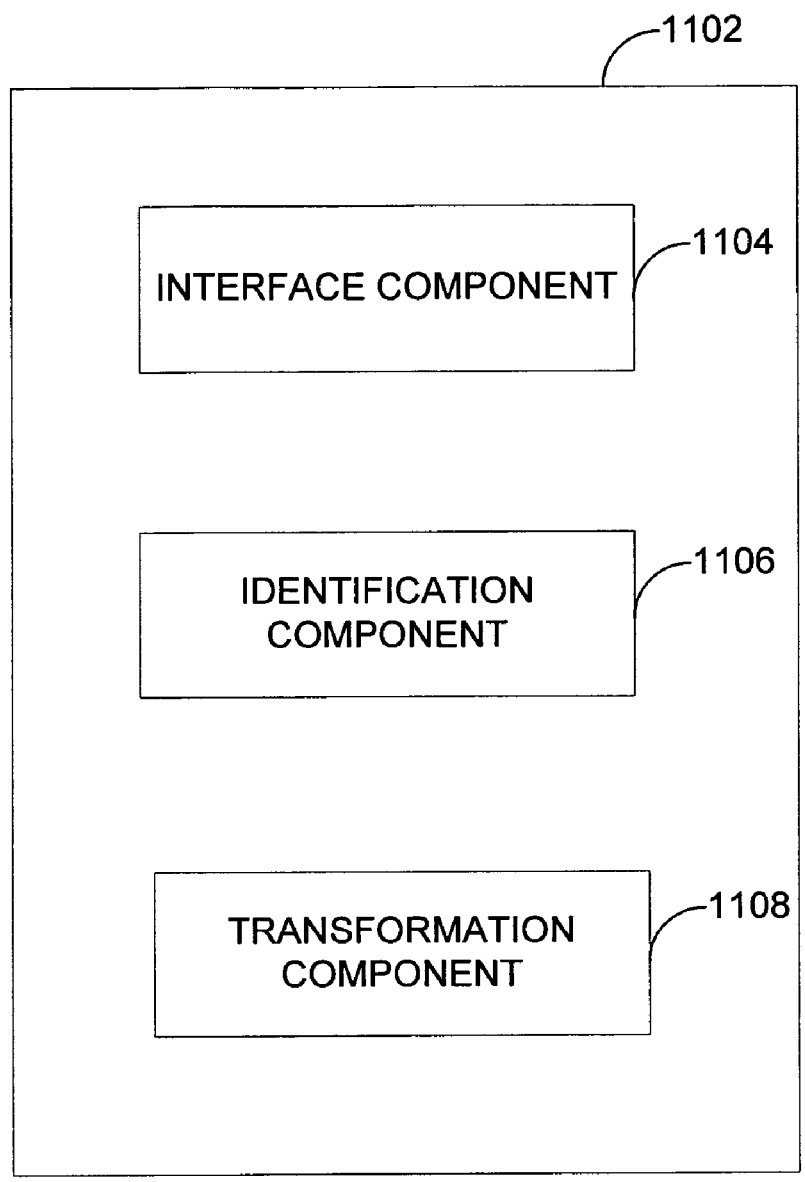
FIGS. 11A to 11D are block diagrams illustrating exemplary computer-readable media on which aspects of the invention may be stored.

In another embodiment, a computer-readable medium 1102 (in FIG. 11A) on which aspects of the invention described above may be stored. For example, an interface component 1104, an identification component 1106, and a transformation component 1108 may be included in the EDI engine 312 performing one or more operations discussed above.

It is also to be understood that the method illustrated in FIG. 4A may be performed by the source 304 such that the source 304 would reduce the size of interchange before transmission. As such, the nested structure or sub-documents of the consolidated EDI document 314 reduces the number of lines, which may also reduce the cost of transmitting the EDI data when it is charged according to the number of lines.

For example, Table 1 illustrates three EDI transactions in a nested structure in the consolidated EDI document and the corresponding three original EDI documents that each includes one of the three EDI transactions.

TABLE 1

Three EDI transactions in a nested structure (left column) and in three EDI documents (right column)

| EDI transactions in a Nested Structure | Flatten EDI transactions for downstream processing |
|---|---|
| BeginOfTransaction#1 | BeginOfTransaction#1a |
| POHeaderSegment | POHeaderSegment |
| POLine1 | POLine1 |
|    POSchedule1.1 | POSchedule1.1 |
|    POSchedule1.2 | POLine1Totals |
|    POLine1Totals | POTotals |
| POLine2 | EndOfTransaction#1a |
|    POSchedule2.1 | BeginOfTransaction#1b |
|    POLine2Totals | POHeaderSegment |
| POTotals | POLine1 |
| EndOfTransaction#1 | POSchedule1.2 |
| | POLine1Totals |
| | POTotals |

TABLE 1-continued

Three EDI transactions in a nested structure (left column)
and in three EDI documents (right column)

| EDI transactions in a Nested Structure | Flatten EDI transactions for downstream processing |
|---|---|
| | EndOfTransaction#1b |
| | BeginOfTransaction#1c |
| | POHeaderSegment |
| | POLine2 |
| | POSchedule2.1 |
| | POLine2Totals |
| | POTotals |
| | EndOfTransaction#1c |

In operation, suppose a health care sponsor, such as an Employer A, needs to send an EDI message, such as a HIPAA 834 document, to a payer, such as a healthcare provider B. The schema for such interchange requires the Employer A to provide details of the benefits of the healthcare beneficiaries/recipients (e.g., employees and their dependents). As such, the Employer A typically includes detail information of the sponsor and the payer. This detailed information of the sponsor and the payer is common to all beneficiaries and is repeated for each employee or dependent that is receiving the benefit sponsored by the Employer A. Instead of repeating the identical sponsor and payer information repeated for thousands of employees and dependents as in existing EDI implementations, embodiments of the invention create a nested structure such that each member can be created along with a copy of the detailed information of the sponsor and the payer in a loop-like logic in one EDI document.

Figure 5A:
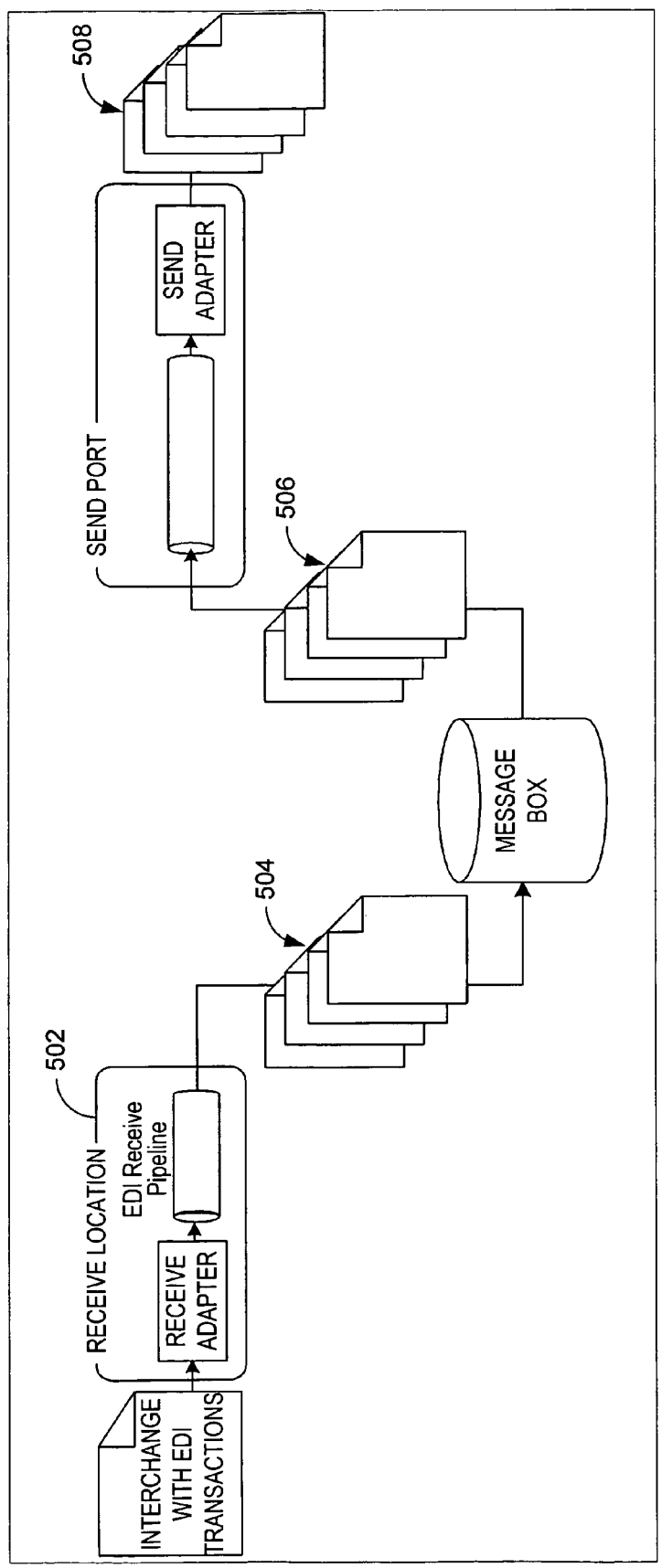
FIG. 5A is a block diagram illustrating nesting of EDI transaction according to an embodiment of the invention.

FIG. 5A is a block diagram illustrating nesting of EDI transaction according to an embodiment of the invention. For example, at 502, EDI message (e.g., EDI message 310) is received from a source (e.g., the source 304) at a destination (e.g., destination 306). At 504, a consolidated EDI document is generated with EDI transactions included in a nested structure or as sub-documents. In one example, the envelope/control segments (e.g., ISA/GS/GE/IEA segments in ANSI X12 format) are stripped and the transaction set (ST/SE) is parsed by the receive pipeline to generate multiple XML sub-documents per transaction set. In one embodiment, the multiple XML sub-documents are deposited in a message box. At 506, the receive pipeline at the destination carries out validation of the incoming interchange and generates appropriate validation acknowledgement (to be discussed in detail in FIGS. 8, 9A and 9B). In one embodiment, the receive pipeline also updates check sum and business totals.

As described above, the consolidated EDI document 314 may be processed by the downstream application 316. As such, the consolidated EDI document is sent to a send port, and, at 508, the send port transmits the EDI transactions in EDI sub-documents. In one embodiment, a send pipeline associated with the send port serializes the XML sub-documents and delivers 'n' interchanges with a count of the segments being updated at the send pipeline.

In one embodiment, when an EDI interchange is received, it is validated. If there are no validation errors, each transaction set is converted into XML format according to its schema. Thus, an EDI interchange can contain purchase orders and invoice documents. Purchase orders would be converted to XML that is compliant with purchase order schema. Likewise, invoice would be converted to invoice XML.

FIG. 5B illustrates an exemplary purchase order from an EDI interchange in XML format. When this purchase order document is processed by send side in FIG. 5A, it is converted to an EDI format 514 after processing of envelope segments. FIG. 5C illustrates an exemplary document produced by send port from the XML format in FIG. 5B. In one embodiment, the EDI format 514 includes two envelope segments (e.g., lines that start with ISA and GS). Similarly, the EDI format 514 includes two envelope segments, GE and IEA, at the end of the document. As illustrated, data included between ST and SE segments is the data for the original transaction set.

In the above example as illustrated in FIGS. 5B and 5C, the value of SE01 (see arrow 512) is "14" and is computed dynamically by the send port. While serializing an EDI document, the send side of the EDI engine (e.g., EDI engine 312) keeps track of the number of segments present in a transaction set. Based on this value, the value of SE01 is determined.

Where the source 304 generates the consolidated EDI document 314 to include EDI transactions from the plurality of EDI documents, embodiments of the invention include organizing the included EDI transactions in a nested structure. In another example, embodiments of the invention enable the destination 306 that receives the consolidated EDI document 314 from the source to restore the plurality of EDI documents from the consolidated EDI document 314 for backward compatibility or accommodating the downstream application 316 that can only process EDI documents that only contain one transaction per document. Alternative embodiments of the invention enable the consolidated EDI document with EDI transactions in nested structures to track or correlate with the original plurality of EDI documents.

For example, Table 2 illustrates converting EDI transactions from the consolidated EDI document 314 to a plurality of EDI documents.

TABLE 2

Consolidated EDI document conversion.

| A0 Schema (min occurs and max occurs) | A1 Original Instance | A2 Split #1 | A3 Split #2 | A4 Split #3 |
|---|---|---|---|---|
| ST (1, 0) | ST | ST | ST | ST |
| AA (1, 1) | AA | AA | AA | AA |
| BB loop (1, n) – sub doc break = yes | **BB1*1** | **BB1*1** | BB1*2 | *BB1*3* |
| BB1(1, 1) | **BB2*1** | **BB2*1** | CC | *BB2*3* |
| BB2(0, 1) | BB1*2 | CC | CC | CC |
| CC (1, n) | *BB1*3* | CC | DD | CC |
| DD (0, n) | *BB2*3* | DD | SE | DD |
| SE | CC | SE | | SE |
| | CC | | | |
| | DD | | | |
| | SE | | | |

In the example shown in Table 2, processing of EDI transactions in a nested structure begins by identifying a predetermined SubDocumentCreationBreakPoint (e.g., an "\" marker that describes where a child document begins within a parent document) to generate multiple sub-documents.

According to Table 2, the consolidated EDI document shown in column A1 can be split into three transactions according to the sub-document creation break defined at BB loop in the schema: BB1*1-BB2*1, BB1*2, and BB1*3-BB2*3. In column A2, the transaction set BB1*1-BB2*1 is organized or split (denoted by the bold face text) into a separate document, while in column A3, the transaction BB1*2 is organized in a second document (denoted by the underlined text). Similarly, the transaction set BB1*3-BB2*3 is organized into a third EDI document (denoted by the italicized text) to be processed by the downstream application 316.

By transforming EDI transactions included in the plurality of EDI documents to the consolidated EDI document 314, embodiments of the invention enable the destination 306 or the source 304 efficiently identifies the plurality of schemas included in each of the EDI documents during the transformation. In addition, at least one aspect of the invention enables the destination 306, after transforming the consolidated EDI document, to generate a validation acknowledgement to be returned to the source 304 during the time period when the connection session is still opened. In other words, aspects of the invention configure the destination 306 to automatically identify the plurality of schemas and validate the EDI transactions while the EDI transactions are received.

Figure 7A:
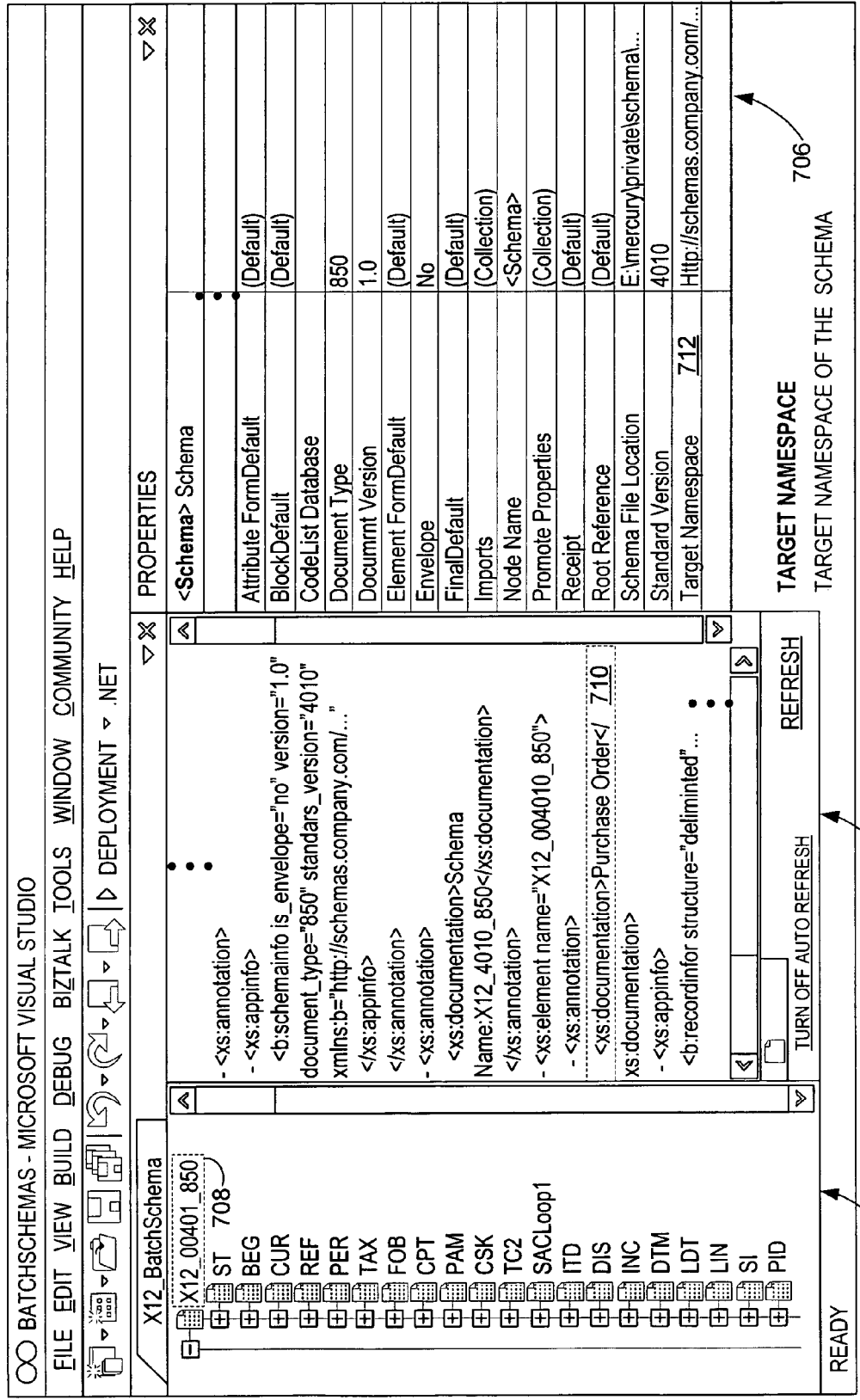

Referring now to FIGS. 7A-7D, a series of screen shots illustrating identifying EDI schemas automatically according to an embodiment of the invention. FIG. 7A shows a typical ANSI X12 purchase order schema. A schema is identified by a DocType associated with. A DocType is a combination of configuration items such as a namespace and a root node name. As shown in FIG. 7A, a left column 702 of the screen shot indicates a hierarchical structure of a schema. In this example, the left column 702 shows a schema structure. A center column 704 indicates the XML code of the schema. A right column 706 indicates properties or the target namespace included in the schema.

In one embodiment, the DocType has a format of: "DocType=TargetNamespace '#' RootNodeName" in X12 format, which will be described in detail below. It is to be understood that while an X12 schema is described in FIG. 7A, other schema formats, such as EDIFACT schemas, may be used without departing from the scope of the invention.

A root node of the DocType has one of the following formats in X12: "X12_{Version}_{TsId}." In this example, the value of the configuration item "root node" is "X12_00401_850," as indicated by box 708. In other words, "00401" is the version of the document and it is a dynamic piece of information which determines a configuration or instance during runtime processing. Similarly, "850" is TsId, which is the transaction identification (ID) of the schema that is being processed and is determined from the input instance. In this example, the transaction ID of "850" represents a purchase order, as indicated by a box 710. Also, the target namespace is indicated by a box 712 in the right column 706.

In another example, to decode or identify schemas in EDIFACT format, EDIFACT schemas currently have the following format: "Efact_{Version}_{Tsid}." In other words, all EDIFACT schemas have root node name that starts with "Efact," and the definitions of Version and Tsid are the same as that of X12 format.

Using FIG. 3 as an example, when the destination 306 receives the EDI documents from the source 304, the EDI transactions may include the transaction ID "850" with the document. However, the version information or the target namespace information is determined at runtime and the values of these configuration items may be configured at different levels. As such, after applying rules according to EDI standards (e.g., X12 or EDIFACT) to decode the EDI transactions according to the corresponding transaction types (e.g., purchase order, invoice, or the like), the EDI engine 312 identifies configuration items in the decoded EDI transactions. In one embodiment, the EDI engine 312 identifies the configuration items from one or more configuration levels, such as partner level and sending application level, global level, pipeline level, or a default level.

For example, FIG. 7B illustrates a screen shot showing configuration items in the party level configuration. In this example, the transaction ID 850 for the above partner shown in FIG. 7A is configured to use the target namespace and version information as shown above. For all other document types, default values would be used, since the default flag or parameter is turned on, as indicated by a box 714. In another example, another trading partner may set other specific configuration items in the party level configuration based on the business agreements established between the business trading partners. Instead of statically determines the value of the configuration items, embodiments of the invention, in automatically identifying schemas, identifies values of the configuration items by determining the specific values that are set by the trading partner from one or more configuration levels.

In one embodiment, the values of configuration items in the party level configuration may be configured to different values from those shown in DocType in FIG. 7A due to a specific combination of sender Id and Transaction Id. For example, in X12, each sender Id may represent a certain department within an enterprise. As such, a sender ID in one enterprise may refer to a "hardware merchandize" department while another sender ID may refer to a "software merchandize" department within the same enterprise. Thus, embodiments of the invention recognize these different configurations and identify the schemas accordingly. As a result, the same purchase order from one enterprise may undergo different schema identification process such that appropriate and different EDI data is generated in XML, for example, in the consolidated EDI document 314 according to the values of configuration items.

It is also to be understood that one or more additional configuration items may be configured or set by the specific business partner without departing from the scope of the invention. For example, one partner may set a minimal amount of configuration while another partner may define detailed configuration items in its party level configuration.

Referring now to FIG. 7C, a screen shot illustrating an EDIFACT schema with its party level configuration. In this example, unlike X12 schemas, the target namespace can be configured based on a specific combination of sender application ID (optional) (such as UNG2.1 in 716 and UNG2.2 in 718), a version 720 (UNG8), and a transaction set ID 722. In other words, it is possible to have multiple configurations for an invoice EDI document, each with a unique application id. In this instance, the target namespace matching a specific application would be used at runtime. In the situation where no sender application ID is configured, a sender application ID value would be matched against any value from existing records (e.g., log files) that carry the same transaction ID. In case multiple matches are found, a default target namespace is used to ensure that, when there is ambiguity, a suitable default value is used.

FIG. 7D is a screen shot illustrates a global level configuration for an X12 schema. In this example, where configuration items, such as target namespace or version is not specified by the trading partners, values of configuration items in the global level configuration would be used. In this example, a box 724 indicates that no values are configured for version and target namespace. As such, the values of the configuration items would not be modified at runtime.

In the situation where some of the missing configuration items at the global level are not configured, the values for configuration items in a pipeline level or runtime level configuration would be used. Thus, if the target namespace is not configured at the global level, the value from the pipeline level configuration would be used. In one embodiment, values in the pipeline level configuration may be set by the user.

Figure 11B:
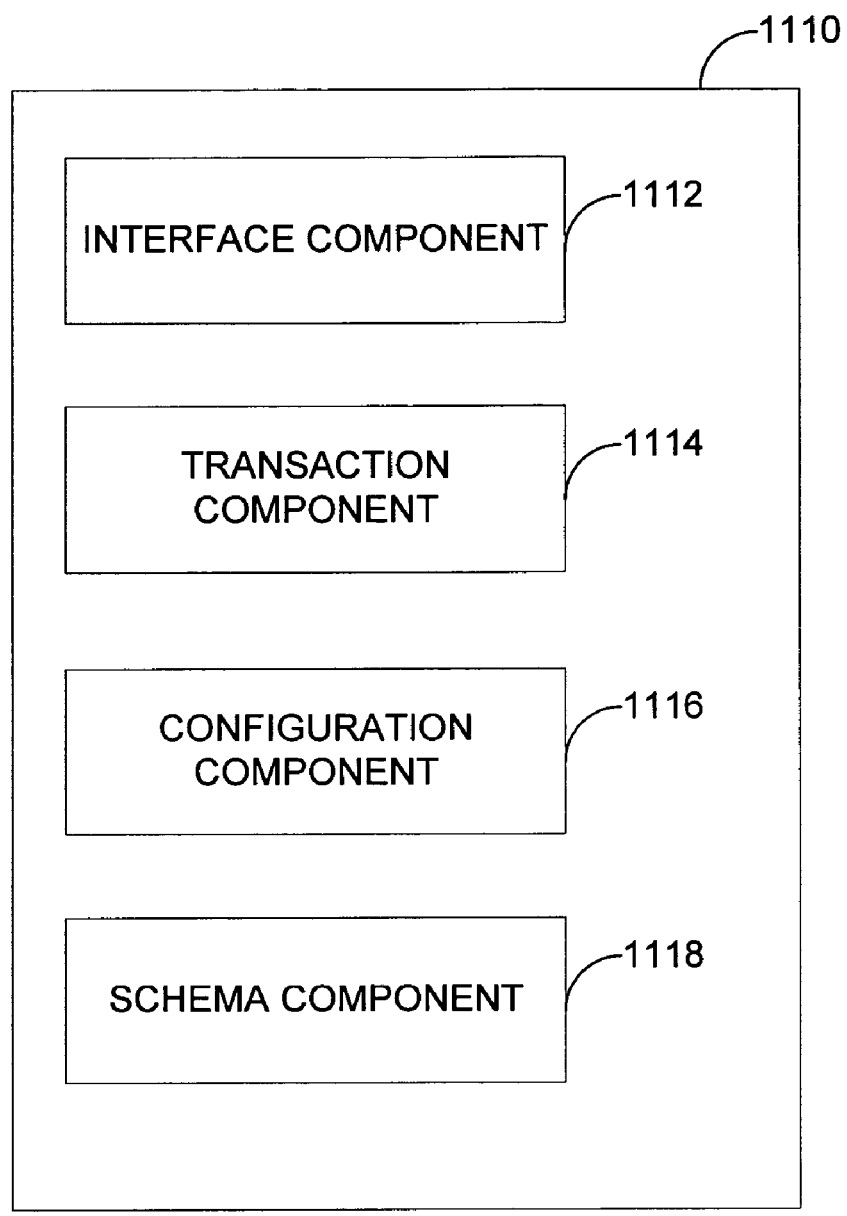

In another embodiment, FIG. 11B illustrates a computer-readable medium 1110 on which aspects of the invention may be stored. For example, an interface component 1112 receives EDI documents in a batch from a source, where each of the EDI documents has at least one EDI transaction corresponding to a transaction type. A transaction component 1114 decodes the EDI transactions according to the corresponding transaction types by applying rules according to EDI standards (e.g., X12 or EDIFACT). A configuration component 1116 identifies values in one or more configuration items for each EDI transaction in the decoded EDI transactions. A schema component 1118 determines one or more schema types based on the values of configuration items.

In an alternative embodiment, the values of configuration items described in the previous sections may be modified at runtime. Thus, values for transaction types, target namespace, version may be modified after the EDI engine 312 is processing the EDI documents (i.e., automatically identifying the schemas). In such an embodiment, the changes would reflect on the subsequent documents that are yet to be processed. Such dynamic implementation of the invention enable the users at the destination 306 to configure values during runtime, not during schema design/configuration time before the EDI documents were sent from the source 304.

In operation, automatic schema identification enables EDI partners to streamline processing of EDI documents. Unlike existing implementation where a receive connection and a send connection need to be configured for every partner and for every document type, the EDI engine 312 enables automatic schema identification such that values of configuration items are identified and determined during runtime, making the EDI business partners flexible in handling EDI data.

Figure 8A:
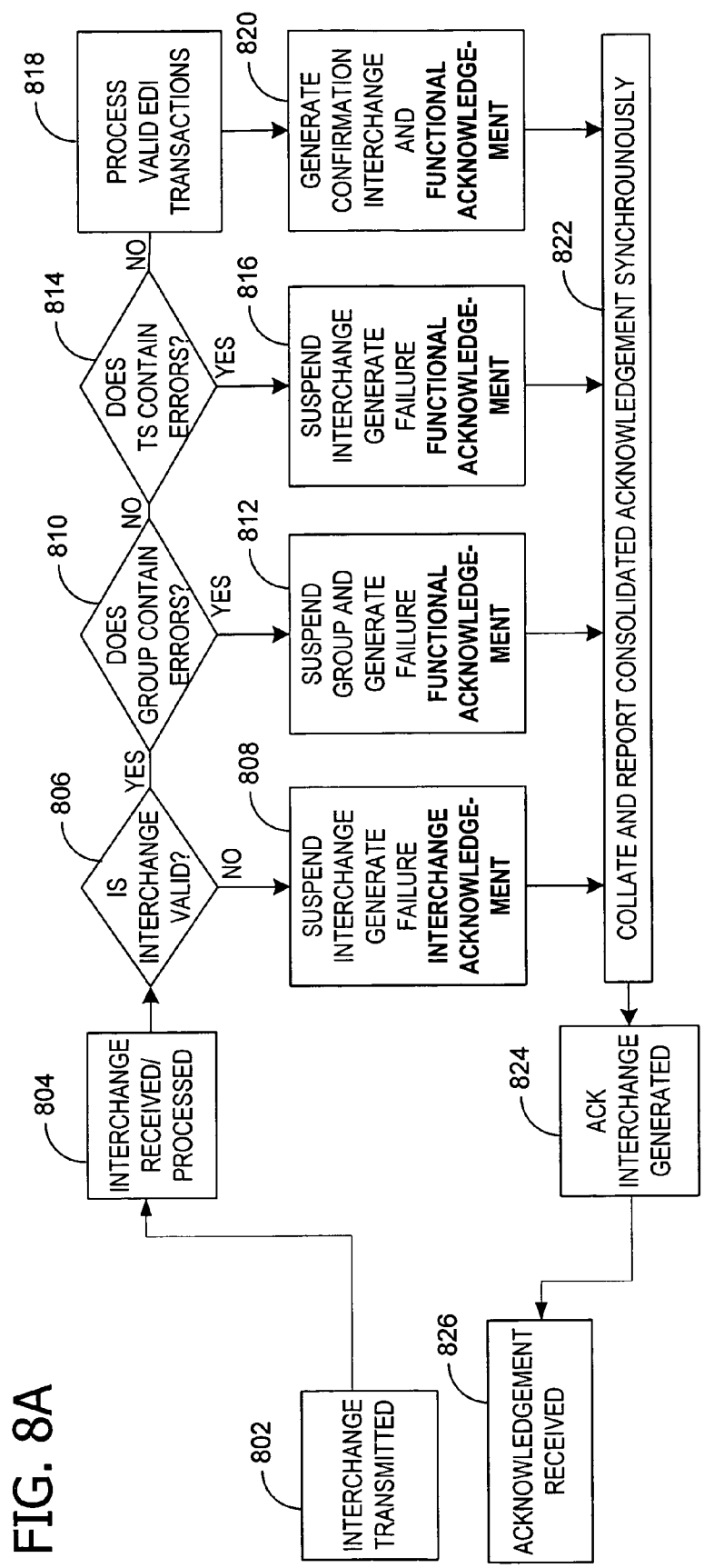
FIG. 8A is a flow chart illustrating validating EDI transactions according to an embodiment of the invention.

Recalling that at least another aspect of the invention includes generating a validation acknowledgement when the EDI data is received, FIG. 8A is a flow diagram illustrating such feature. At 802, an EDI message (e.g., EDI message 310) is transmitted from a source (e.g., source 304) to a destination (e.g., destination 306). At 804, the EDI message, which includes EDI transactions, is received at the destination. It is next determined whether the transmission of EDI message is valid at 806 by determining whether the EDI message is intended for the proper recipient. If it is determined that the transmission of EDI message is invalid, processing of EDI message is suspended and an interchange failure acknowledgement is generated at 808. If it is determined that the interchange of EDI message is valid, it is next determined whether the groups of EDI transactions include errors at 810.

If the groups include errors, processing of the groups of EDI transactions is suspended and a functional failure acknowledgement is generated at 812. For example, an EDI specification may define a number of errors that can be found at group and transaction set levels. Table 3 provides a list of common errors that are applicable to X12 EDI interchanges.

TABLE 3

Functional group errors—errors related to GS/GE segment

| Code | Description—from AK905 code list |
|---|---|
| 1 | Functional group not supported |
| 2 | Functional group version not supported |
| 3 | Functional group trailer missing |
| 4 | Group control number in the functional group header and trailer do not agree |
| 5 | Number of included transaction sets does not match actual count |

For example, the EDI engine 312 determines an error, such as an error code 4, "Group control number in the functional group header and trailer do not agree," by identifying the sixth value of line/segment GS in an EDI message. In FIG. 8B, the sixth value of line GS 532 has a value of "9" (as indicated by a box 528). In validating the EDI transaction, embodiments of the invention determines whether the same value is also present in the second value of line GE 534. As illustrated in FIG. 8B, the second value of line GE 534 is "10" (as indicated by a box 530). With such discrepancy, it is determined that there is an error in this EDI message.

In another example, an error code 5, "Number of included transaction sets does not match actual count," is detected by identifying transaction sets between a GS-GE segment. As illustrated in FIG. 8B, there is one GS-GE segment while the first value of GE line is "02," indicating there are two transaction sets. As such, this functional group is in error.

If, however, it is determined there is no errors in the groups, it is next determined whether each of the EDI transactions is valid at 814 by evaluating the formatting rules according to X12 or EDIFACT format and the rules according to schemas included in the EDI transactions. If it is determined that an EDI transaction is invalid, processing of the EDI transactions is suspended and a functional failure acknowledgement is generated at 816.

For example, Table 4 provides a list of common transaction errors.

TABLE 4

Transaction set errors—errors related to data within ST and SE

| Code | Description—from AK502 code list |
|---|---|
| 1 | Transaction set not supported |
| 2 | Transaction set trailer missing |
| 3 | Transaction set control number in header and trailer do not match |
| 4 | Number of included segments does not match actual count |
| 5 | One or more segments in error |
| 6 | Missing or invalid transaction set identifier |
| 7 | Missing or invalid transaction set control number |

Using FIG. 8B as an example, an EDI engine (e.g., EDI engine 312) identifies an error code 4, "Number of included segments does not match actual count," by evaluating the number of segments (lines) between ST and SE. In this example, the number is "12" while the first value in SE line is 14. As such, there is an error in this transaction set, and such error code may be included in the functional failure acknowledgement.

In one embodiment, an EDI engine (e.g., EDI engine 312) can reference or has knowledge of various error conditions or rules of EDI transactions. While processing an EDI document, the EDI engine 312 ensures that none of the EDI formatting rules are violated. On any violation, the EDI engine 312 reports appropriately in the form of interchange or functional level acknowledgements.

Alternatively, if the EDI transactions are valid, the EDI engine 312 at the destination proceeds to process the EDI transactions at 818. At 820, a validation acknowledgement is generated at 820 indicating that the EDI transactions are valid. In one embodiment, the EDI engine 312 may collate and generate a consolidated validation acknowledgement as the EDI message, EDI groups, and/or EDI transactions are received and validated. In another embodiment, the EDI engine generates the consolidated validation acknowledgement substantially simultaneously as the EDI message, EDI groups, and/or EDI transactions are received.

At 824, the generated validation acknowledgement is returned to the source receiving the validation acknowledgement at 826. In one embodiment, the source opens a connection session for transmitting EDI message and receives the validation acknowledgement before the same connection session is closed. As such, no database or data store access or disk I/O during document validation because the validation process is handled during runtime or during receipt of the EDI transaction, as shown by arrow 318 in FIG. 3. In yet another embodiment, the validation process may be extended by plugging-in handlers at runtime.

In an alternative embodiment, the different validation acknowledgement types may be generated and transmitted to separate locations (such location information may be found in the header portion 106) while the EDI message/transactions are received. As such, embodiments of the invention generate and transmit the validation acknowledgement in one or more stages (e.g., after validating one aspect of the interchange) or in a single stage with consolidated acknowledgement. In yet another embodiment, these acknowledgements may be configured for delivery on the same or new socket connection session to different destinations, as indicated by arrow 320 in FIG. 3.

For example, suppose the schemas or formatting rules indicate that a validation acknowledgement for a purchase order is configured to be sent to a customer service department of an enterprise while an invoice validation acknowledge is configured to be transmitted to the accounting department of the same enterprise. Aspects of the invention enable transmitting the respective acknowledgements to the proper destination by opening new connection sessions. FIG. 9A illustrates a validation acknowledgement for X12 formatted EDI transactions while FIG. 9B illustrates a validation acknowledgement for EDIFACT formatted EDI transactions.

Figure 11C:
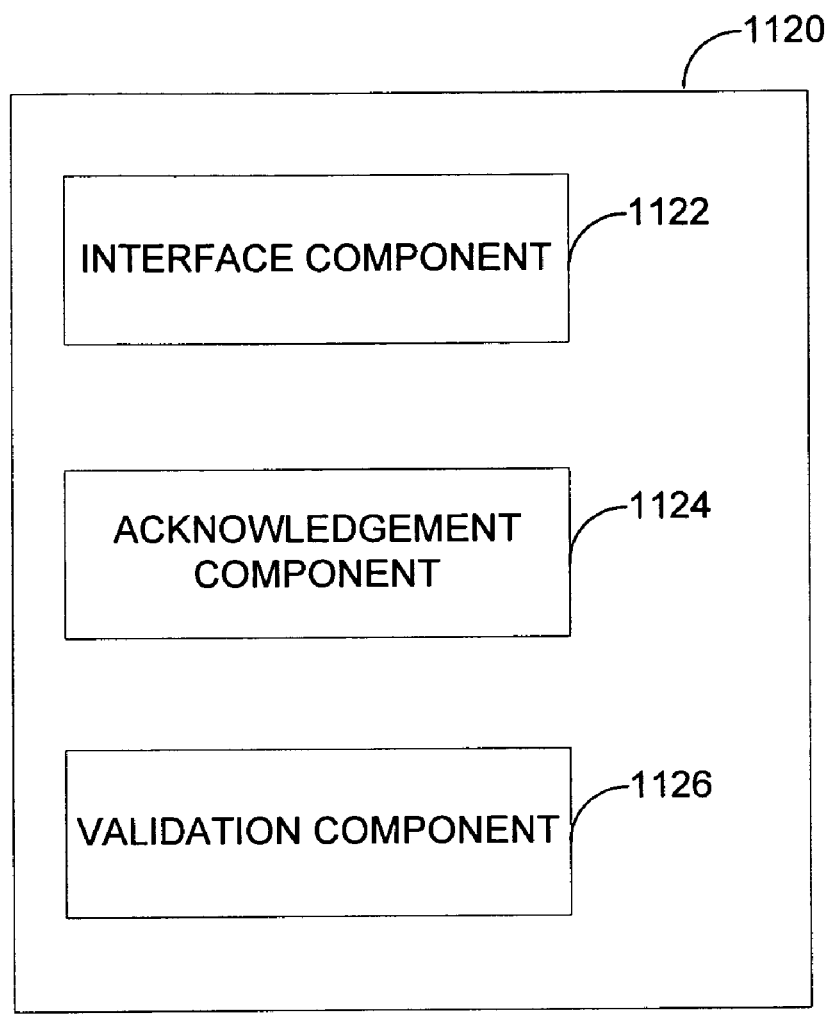

In another embodiment, FIG. 11C illustrates a computer-readable medium 1120 on which aspects of the invention may be stored. For example, an interface component 1122, an acknowledgement component 1124, and a validation component 1126 may be incorporated and integrated in the EDI engine 312 for performing one or more steps as described in FIG. 8A.

Additional aspects of the invention enable modification of EDI schemas without requiring the end users to be as knowledgeable as an EDI schema developer. For example, suppose a new department is established within an enterprise, but there is no customized EDI schema or rule adopted for the new department. Instead of requesting an EDI schema developer to design a specific EDI schema for the new department, embodiments of the invention define a meta-schema to represent all schemas such that properties of the schemas are presented to the end users for modification.

FIG. 10A is a screen shot illustrating a unitary meta-schema for modifying a plurality of EDI schemas according to an embodiment of the invention. In a window pane 1002, the structure of a unitary meta-schema is presented to the end user. As soon as the end user highlights a property (indicated by the dashed box enclosing "MaxOccurs", a corresponding property code section is highlighted in a window pane 1004, enabling the end user to modify the values of the properties. In one embodiment, the end user is provided by a user interface (UI) embodying the aspect of the invention as illustrated in FIG. 10A. Appendix A describes the XML schema shown in FIG. 10A in its entirety.

Figure 10B:
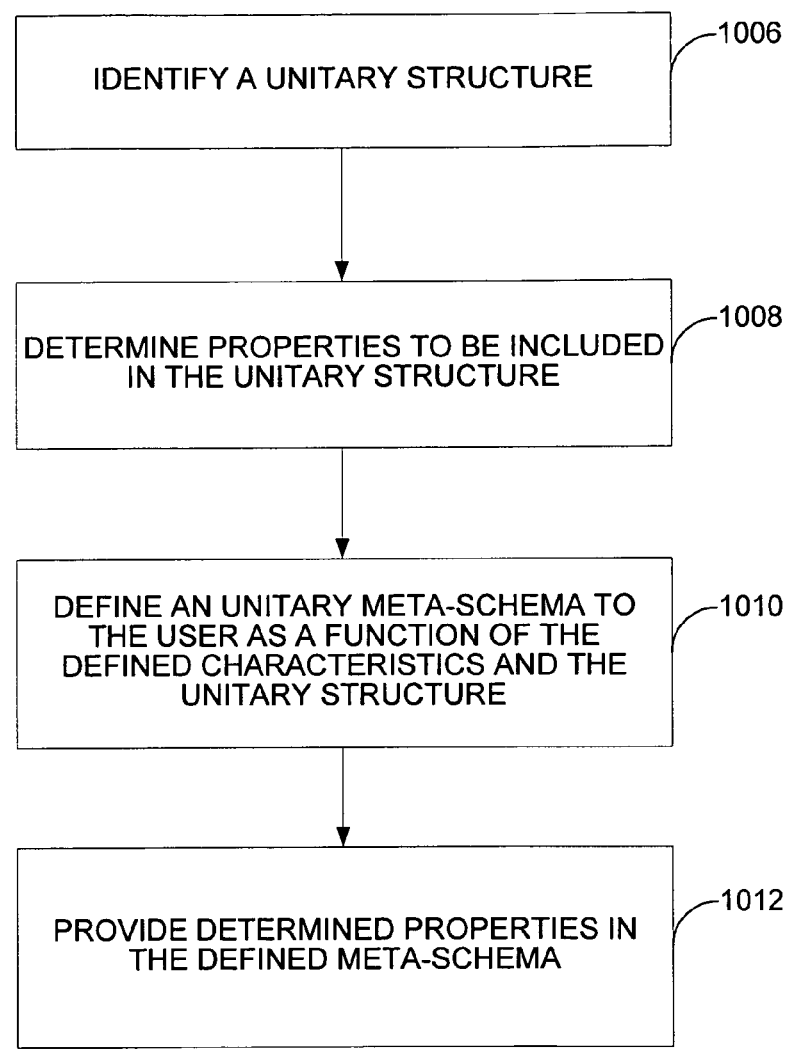
FIG. 10B is a flow chart illustrating a method for modifying a plurality of EDI schemas using a unitary meta-schema according to an embodiment of the invention.
Figure 11D:
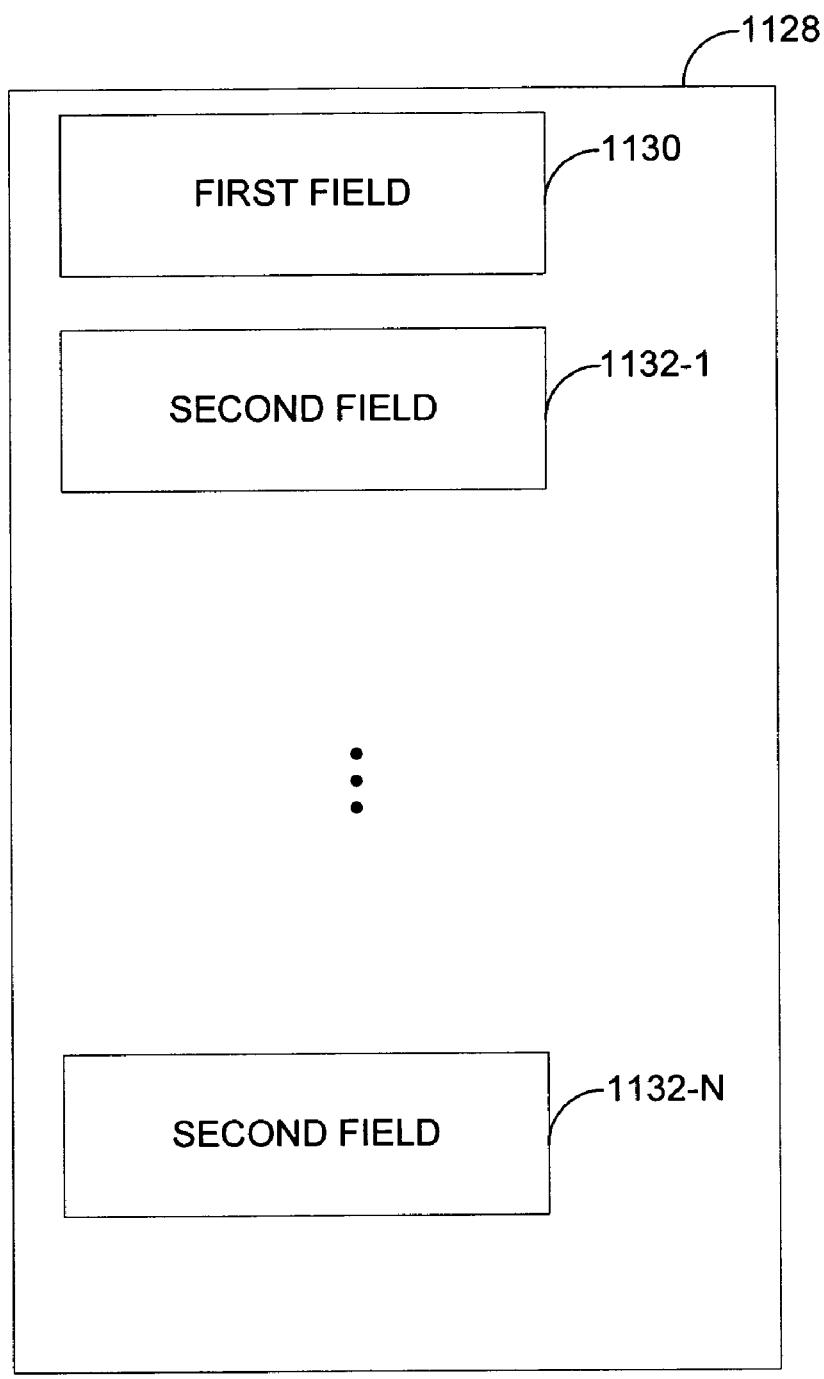

FIG. 10B is a flow chart illustrating a method for modifying the plurality of EDI schemas using the unitary meta-schema according to an embodiment of the invention. At 1006, a unitary structure representing the plurality of EDI schemas is identified by decoding the data in the plurality of EDI schemas. In one example, the unitary structure, such as a data structure 1128 in FIG. 11D, represents the plurality of EDI schemas by capturing one or more of the following data:

1. Each EDI schema consists of a root element which has a name;
2. The root element consists of repeating data blocks which could be either Loops or Segments;
3. Each Loop has the following structure
    a. Name—name of the loop
    b. Block—Collection of data elements
    c. MinOccurs—Minimum number of occurrences
    d. MaxOccurs—maximum number of occurrences
4. Each Segment has various properties
    a. Name—name of the segment
    b. TagId—TagId of the segment
    c. MinOccurs—Minimum number of occurrences
    d. MaxOccurs—maximum number of occurrences
    e. List of Data Elements
5. Each data element consists of a collection of elements, each of which could be either a Composite element or a Simple Element
6. Each SimpleElement has various properties
    a. Name—name of the element
    b. MinOccurs—Minimum number of occurrences
    c. MaxOccurs—maximum number of occurrences
    d. MinLength—minimum length of data
    e. MaxLength—maximum length of data
    f. DataType—data type, the allowed values are A, AN, ID, R, N, Date, Time—one for each EDI data type
    g. AllowedValues—set of allowed values, applicable only when an element is of type ID.

For example, the data structure 1128 includes a first data field 1130 including root data associated with a root element of each of the plurality of EDI schemas. The data structure also includes one or more second data fields 1132 including data representing one or more data blocks of each of the plurality of EDI schemas. The data in the one or more second data fields is defined as a function of the root data in the first data field 1130.

At 1008, properties to be included in the unitary structure are determined. The properties define characteristics of the plurality of the EDI schemas. For example, a root element with a property value of "purchase order" indicates that the characteristics of the unitary structure corresponds to a purchase order schema, such as the one shown in FIG. 7A. With the unitary structure having property values, a unitary meta-schema is defined for the user as a function of the defined characteristics and the unitary structure at 1010. The defined meta-schema corresponds to the plurality of EDI schemas. At 1012, the determined properties in the defined meta-schema are provided to the end user so that the end user is able to modify the characteristics of each of the plurality of EDI schemas, as illustrated in FIG. 10A.

Appendix B shows an exemplary unitary meta-schema in XML format representing a purchase order schema with the following structure:

1. PurchaseOrderDetail segment;
2. A Loop consisting of LineItem and ShippingAddress segment;
3. Notes segment.

FIG. 12 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 12 illustrates operating system 144, application programs 146, other program modules 148, and program data 150.

The computer 130 may also include other removable/non-removable, volatile/nonvolatile computer storage media. For example, FIG. 12 illustrates a hard disk drive 154 that reads from or writes to non-removable, nonvolatile magnetic media. FIG. 12 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 12, provide storage of computer readable instructions, data structures, program modules and other data for the computer 130. In FIG. 12, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 12 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 12 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment.

Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Section 1: A meta-schema representing an EDI schema in XML format:

```
<?xml version="1.0" encoding="utf-16"?>
<xs:schema xmlns:b="http://schemas.company.com/BizApp/2003"
xmlns="http://schema.company.com/EdiClient/MetaSCHEMA"
targetNamespace="http://schema.company.com/EdiClient/MetaSCHEMA"
xmlns:xs="http://www.w3.org/2001/XMLSchema">
    <xs:element name="EdiSchemaRoot">
```

APPENDIX A-continued

Section 1: A meta-schema representing an EDI schema in XML format:

```
    <xs:complexType>
      <xs:sequence>
        <xs:element name="RootElementName" type="xs:string" />
        <xs:element ref="Block" />
      </xs:sequence>
    </xs:complexType>
  </xs:element>
  <xs:element name="Block" type="BlockType" />
  <xs:element name="Segment">
    <xs:complexType>
      <xs:sequence>
        <xs:element name="Name" type="xs:string" />
        <xs:element name="TagId" type="xs:string" />
        <xs:element name="MinOccurs" type="xs:integer" />
        <xs:element name="MaxOccurs" type="xs:integer" />
        <xs:element name="DataElementList">
          <xs:complexType>
            <xs:sequence>
              <xs:choice minOccurs="1" maxOccurs="unbounded">
                <xs:element name="CompositeElement">
                  <xs:complexType>
                    <xs:sequence>
                      <xs:element name="Name" type="xs:string" />
                      <xs:element maxOccurs="unbounded"
                      ref="SimpleElement" />
                    </xs:sequence>
                  </xs:complexType>
                </xs:element>
                <xs:element ref="SimpleElement" />
              </xs:choice>
            </xs:sequence>
          </xs:complexType>
        </xs:element>
      </xs:sequence>
    </xs:complexType>
  </xs:element>
  <xs:element name="SimpleElement">
    <xs:complexType>
      <xs:sequence>
        <xs:element name="Name" type="xs:string" />
        <xs:element name="MinOccurs" type="xs:string" />
        <xs:element name="MaxOccurs" type="xs:string" />
        <xs:element name="MinLength" type="xs:string" />
        <xs:element name="MaxLength" type="xs:string" />
        <xs:element name="DataType">
          <xs:simpleType>
            <xs:restriction base="xs:string">
              <xs:enumeration value="A" />
              <xs:enumeration value="N" />
              <xs:enumeration value="ID" />
              <xs:enumeration value="R" />
              <xs:enumeration value="AN" />
              <xs:enumeration value="Date" />
              <xs:enumeration value="Time" />
            </xs:restriction>
          </xs:simpleType>
        </xs:element>
        <xs:element minOccurs="0" maxOccurs="unbounded" name="AllowedValues"
type="xs:string" />
      </xs:sequence>
    </xs:complexType>
  </xs:element>
  <xs:complexType name="BlockType">
    <xs:sequence>
      <xs:choice minOccurs="0" maxOccurs="unbounded">
        <xs:element name="Loop">
          <xs:complexType>
            <xs:sequence>
              <xs:element name="Name" type="xs:string" />
              <xs:element ref="Block" />
              <xs:element name="MinOccurs" type="xs:int" />
              <xs:element name="MaxOccurs" type="xs:int" />
            </xs:sequence>
          </xs:complexType>
        </xs:element>
        <xs:element ref="Segment" />
      </xs:choice>
```

APPENDIX A-continued

Section 1: A meta-schema representing an EDI schema in XML format:

```xml
    </xs:sequence>
  </xs:complexType>
</xs:schema>
```

APPENDIX B

Section 2: Sample purchase order schema using the meta-schema unitary structure:

```xml
<ns0:EdiSchemaRoot xmlns:ns0="http://schema.company.com/EdiClient/MetaSCHEMA">
  <RootElementName>X12_00501_850</RootElementName>
  <Block>
      <Segment>
    <Name>PurchaseOrderDetail</Name>
    <TagId>PUR</TagId>
    <MinOccurs>1</MinOccurs>
        <MaxOccurs>1</MaxOccurs>
        <DataElementList>
          <SimpleElement>
            <Name>OriginatorId</Name>
    <MinOccurs>1</MinOccurs>
        <MaxOccurs>1</MaxOccurs>
          <MinLength>4</MinLength>
          <MaxLength>10</MaxLength>
          <DataType>AN</DataType>
        </SimpleElement>
      <SimpleElement>
          <Name>FirstName</Name>
    <MinOccurs>1</MinOccurs>
        <MaxOccurs>1</MaxOccurs>
          <MinLength>1</MinLength>
          <MaxLength>10</MaxLength>
          <DataType>AN</DataType>
        </SimpleElement>
      <SimpleElement>
          <Name>LastName</Name>
    <MinOccurs>1</MinOccurs>
        <MaxOccurs>1</MaxOccurs>
          <MinLength>1</MinLength>
          <MaxLength>10</MaxLength>
          <DataType>AN</DataType>
        </SimpleElement>
      </DataElementList>
      </Segment>
  <Loop>
     <Name>LineItemLoop></Name>
     <MinOccurs>1</MinOccurs>
       <MaxOccurs>unbounded</MaxOccurs>
     <Block>
        <Segment>
           <Name>LineItem</Name>
           <TagId>LIN</TagId>
           <MinOccurs>1</MinOccurs>
        <MaxOccurs>1</MaxOccurs>
        <DataElementList>
           <SimpleElement>
             <Name>ItemId</Name>
        <MinOccurs>1</MinOccurs>
          <MaxOccurs>1</MaxOccurs>
             <MinLength>4</MinLength>
             <MaxLength>10</MaxLength>
             <DataType>AN</DataType>
           </SimpleElement>
        <SimpleElement>
             <Name>Quantity</Name>
          <MinOccurs>1</MinOccurs>
            <MaxOccurs>1</MaxOccurs>
             <MinLength>1</MinLength>
             <MaxLength>5</MaxLength>
             <DataType>N</DataType>
           </SimpleElement>
        </DataElementList>
  </Segment>
    <Segment>
```

APPENDIX B-continued

Section 2: Sample purchase order schema using the meta-schema unitary structure:

```
        <Name>ShipTo</Name>
        <TagId>SHP</TagId>
        <MinOccurs>1</MinOccurs>
    <MaxOccurs>1</MaxOccurs>
    <DataElementList>
        <SimpleElement>
            <Name>FirstName</Name>
        <MinOccurs>1</MinOccurs>
            <MaxOccurs>1</MaxOccurs>
            <MinLength>1</MinLength>
            <MaxLength>10</MaxLength>
            <DataType>AN</DataType>
        </SimpleElement>
    <SimpleElement>
            <Name>LastName</Name>
        <MinOccurs>1</MinOccurs>
            <MaxOccurs>1</MaxOccurs>
            <MinLength>1</MinLength>
            <MaxLength>10</MaxLength>
            <DataType>AN</DataType>
        </SimpleElement>
        <CompositeElement>
            <Name>Address</Name>
            <SimpleElement>
                <Name>StreetInfo</Name>
            <MinOccurs>1</MinOccurs>
                <MaxOccurs>1</MaxOccurs>
                <MinLength>1</MinLength>
                <MaxLength>100</MaxLength>
                <DataType>AN</DataType>
            </SimpleElement>
            <SimpleElement>
            <Name>City</Name>
        <MinOccurs>1</MinOccurs>
            <MaxOccurs>1</MaxOccurs>
                <MinLength>1</MinLength>
                <MaxLength>100</MaxLength>
                <DataType>AN</DataType>
            </SimpleElement>
            <SimpleElement>
            <Name>State</Name>
        <MinOccurs>1</MinOccurs>
            <MaxOccurs>1</MaxOccurs>
                <MinLength>2</MinLength>
                <MaxLength>2</MaxLength>
                <DataType>ID</DataType>
            </SimpleElement>
            <SimpleElement>
                <Name>Zip</Name>
            <MinOccurs>1</MinOccurs>
                <MaxOccurs>1</MaxOccurs>
                <MinLength>5</MinLength>
                <MaxLength>10</MaxLength>
                <DataType>N</DataType>
            </SimpleElement>
        </CompositeElement>
    </DataElementList>
    </Segment>
    </Block>
        </Loop>
<Segment>
    <Name>Notes</Name>
    <TagId>NTE</TagId>
    <MinOccurs>0</MinOccurs>
        <MaxOccurs>1</MaxOccurs>
        <DataElementList>
            <SimpleElement>
                <Name>NoteLine1</Name>
        <MinOccurs>0</MinOccurs>
            <MaxOccurs>1</MaxOccurs>
                <MinLength>1</MinLength>
                <MaxLength>80</MaxLength>
                <DataType>AN</DataType>
            </SimpleElement>
        <SimpleElement>
                <Name>NoteLine2</Name>
```

APPENDIX B-continued

Section 2: Sample purchase order schema using the meta-schema unitary structure:

```
        <MinOccurs>0</MinOccurs>
          <MaxOccurs>1</MaxOccurs>
            <MinLength>1</MinLength>
            <MaxLength>80</MaxLength>
            <DataType>AN</DataType>
          </SimpleElement>
          <SimpleElement>
            <Name>NoteLine3</Name>
        <MinOccurs>0</MinOccurs>
          <MaxOccurs>1</MaxOccurs>
            <MinLength>1</MinLength>
            <MaxLength>80</MaxLength>
            <DataType>AN</DataType>
          </SimpleElement>
        </DataElementList>
      </Segment>
    </Block>
</ns0:EdiSchemaRoot>
```

What is claimed is:

1. A method implemented at least in part by a computing device for acknowledging receipt and validating electronic data interchange (EDI) transactions, said method comprising:

establishing an active connection session on a communication network for handling EDI transactions from a source;

receiving the EDI transactions via the communication network;

returning a receipt acknowledgement to the source indicating the EDI transactions have been received;

identifying one or more schemas associated with each of the received EDI transactions;

during the established active connection session, synchronously validating each of the EDI transactions as the EDI transactions are received, said synchronously validating comprising determining whether each received EDI transaction conforms to formatting rules specified in the identified schemas associated with the received EDI transaction; and for each received EDI transaction, when said determining indicates that the received EDI transaction does not conform to the formatting rules specified in the identified schemas associated with the received EDI transaction, suspending the synchronously validating of the received EDI transaction, generating a functional failure acknowledgement, and transmitting via the communication network the functional failure acknowledgement to the source; or for each received EDI transaction, when said determining indicates that the received EDI transaction conforms to the formatting rules specified in the identified schemas associated with the received EDI transaction, transmitting via the communication network a formatting validation acknowledgement to the source before the established connection session is terminated, said validation acknowledgement indicating the received EDI transaction has been validated.

2. The method of claim 1, wherein validating comprises substantially simultaneously validating the EDI transactions as the EDI transactions are received via the communication network.

3. The method of claim 1, further comprising receiving rules associated with the EDI transactions, and wherein validating comprises validating the EDI transactions by determining whether the EDI transactions comply with the rules.

4. The method of claim 1, wherein transmitting further comprising selectively transmitting a second validation acknowledgement based on the EDI transactions in at least one of the following connection sessions: the established active connection session or a second connection session.

5. The method of claim 1, wherein receiving comprises receiving the EDI transactions in an EDI document, said EDI document including an uber-schema referenced by the EDI transactions.

6. The method of claim 5, further comprising scanning a header portion of the EDI document to determine a destination information defining a destination where at least one of the following is to be delivered: a receipt acknowledgement and a validation acknowledgement.

7. The method of claim 1, further comprising generating another receipt acknowledgement or another validation acknowledgement to be routed to the destination based on information included in the header portion of the EDI document.

8. The method of claim 1, wherein one or more computer-storage media have computer-executable instructions for performing the method of claim 1.

9. A system for validating electronic data interchange (EDI) transactions, said system comprising:

an interface for receiving a message from a source, said message including a plurality of EDI transactions, said interface beginning an active connection session with the source for the receiving;

a processor for executing computer-executable instructions for:

generating a transport receipt acknowledgement to the source indicating the plurality of EDI transactions has been received;

evaluating the received plurality of EDI transactions according to a schema associated with the plurality of EDI transactions;

during the established active connection session, validating the plurality of EDI transactions while the processor is evaluating the plurality of received EDI transactions, said validating comprising determining whether the received plurality of EDI transactions conform to formatting rules specified in the schema associated with the received plurality of EDI transactions;

when said determining indicates that the received plurality of EDI transactions do not conform to the formatting rules specified in the schema, suspending the validating of the EDI transactions, generating a functional failure acknowledgement, and transmitting via the communication network the functional failure acknowledgement to the source; and when said determining indicates that the received plurality of EDI transactions conform to the formatting rules specified in the schema, generating a payload validation acknowledgement indicating the plurality of EDI transactions has been validated; and wherein the interface transmits the receipt acknowledgement and the validation acknowledgement to the source via the active connection session.

10. The system of claim 9, wherein the processor is further configured to determine a new location for routing the receipt acknowledgement and/or the validation acknowledgement by identifying information in a header portion of the message.

11. The system of claim 10, wherein the processor is further configured to generate another receipt acknowledgement or another validation acknowledgement for routing the another receipt acknowledgement and/or the another validation acknowledgement to the new location according to the information in the header portion of the message.

12. The system of claim 9, wherein the interface establishes a first connection session for receiving the message and for transmitting the receipt acknowledgement and the validation acknowledgement, and wherein the processor substantially simultaneously validates the EDI transactions as the EDI transactions are received before the interface terminates the first connection session.

13. The system of claim 12, wherein the processor generates a second validation acknowledgement based on the EDI transactions in at least one of the following connection sessions: the first connection session or a second connection session to be established by the interface.

14. The system of claim 12, wherein the interface transmits the validation acknowledgement before the interface terminates the first connection session.

15. One or more computer-storage media having computer-executable components for validating electronic data interchange (EDI) transactions, said computer-executable components comprising:

an interface component for receiving a message from a source by establishing an active connection session, said message including EDI transactions;

an acknowledgement component for generating a receipt acknowledgement to the source indicating the EDI transactions has been received;

a validation component for validating the EDI transactions when the EDI transactions are received by the interface component during the established active connection session, said validation component determines whether the received EDI transactions conform to formatting rules specified in a schema associated with the received EDI transactions, said validation component suspending the validating of the received EDI transactions, generating a functional failure acknowledgement with the interface component and transmitting via the communication network the functional failure acknowledgement to the source in response to determining that the received EDI transactions do not conform to the formatting rules specified in the schema, said acknowledgement component generating a validation acknowledgement indicating the received EDI transactions has been validated in response to the validation component determining that the received EDI transactions conform to the formatting rules specified in the schema; and wherein the interface component transmits the receipt acknowledgement and the validation acknowledgement to the source before the interface component terminates the established active connection session.

16. The computer-storage media of claim 15, wherein the validation component substantially simultaneously validates the EDI transactions as the EDI transactions are received before the interface component terminates the established active connection session.

17. The computer-storage media of claim 15, further comprising a message translation engine for identifying location information from a header portion of the message, and wherein the interface component transmits the receipt acknowledgement and the validation acknowledgement to a location according to the identified location information said location being different from the source.

18. The computer-storage media of claim 17, wherein the acknowledgement component further generates another receipt acknowledgement or another validation acknowledgement for routing the another receipt acknowledgement and/or the another validation acknowledgement to the location according to the identified location information.

19. The computer-storage media of claim 15, wherein the message includes a set of rules associated with the EDI transactions.

20. The computer-storage media of claim 19, wherein the validation component validates the EDI transactions by determining whether the EDI transactions comply with the included set of rules.

* * * * *

UNITED STATES PATENT AND TRADEMARK OFFICE
CERTIFICATE OF CORRECTION

PATENT NO. : 7,647,500 B2
APPLICATION NO. : 11/303704
DATED : January 12, 2010
INVENTOR(S) : Machiraju et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1061 days.

Signed and Sealed this

Sixteenth Day of November, 2010

David J. Kappos
*Director of the United States Patent and Trademark Office*